US012689300B2

(12) United States Patent
Saggini et al.

(10) Patent No.: US 12,689,300 B2
(45) Date of Patent: Jul. 21, 2026

(54) INDUCTIVE COUPLED MUTI-STAGE POWER CONVERTER

(71) Applicant: Infineon Technologies Austria AG, Villach (AT)

(72) Inventors: Stefano Saggini, Udine (IT); Kevin Zufferli, Fagagna (IT); Roberto Rizzolatti, Villach (AT); Mario Ursino, Villach (AT); Christian Rainer, Magdalensberg (AT); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 658 days.

(21) Appl. No.: 18/092,599

(22) Filed: Jan. 3, 2023

(65) Prior Publication Data

US 2024/0223091 A1     Jul. 4, 2024

(51) Int. Cl.
H02M 3/335          (2006.01)
H02M 1/00           (2007.01)
         (Continued)

(52) U.S. Cl.
CPC ..... H02M 3/33569 (2013.01); H02M 1/0016 (2021.05); H02M 1/0064 (2021.05);
         (Continued)

(58) Field of Classification Search
CPC ........... H02M 1/00016; H02M 1/0064; H02M 1/007; H02M 1/009; H02M 1/0095;
         (Continued)

(56) References Cited

U.S. PATENT DOCUMENTS 6,975,098 B2    12/2005  Vinciarelli
2020/0350827 A1*  11/2020  Ahmed ............. H02M 3/33573
                  (Continued)

FOREIGN PATENT DOCUMENTS

WO     WO-2006087402 A2 *   8/2008   ............ H02M 5/293

OTHER PUBLICATIONS

Mario Ursino; Roberto Rizzolatti; Gerald Deboy; Stefano Saggini; Kevin Zufferli; "High density Hybrid Switched Capacitor Sigma Converter for Data Center Applications"; May 19, 2022; IEEE; 2022 IEEE Applied Power Electronics Conference and Exposition (APEC) (Year: 2022).*
                  (Continued)

*Primary Examiner* — Thienvu V Tran
*Assistant Examiner* — Shahzeb K Ahmad
(74) *Attorney, Agent, or Firm* — Armis IP Law, LLC

(57)                ABSTRACT

A power supply includes a first power converter stage and a second power converter stage. The first power converter stage includes a first transformer winding; the second power converter stage includes a second transformer winding. The first power converter stage converts an input voltage into an intermediate voltage. The second power converter stage converts the intermediate voltage into first current contributing to generation of the output voltage. A circuit path in the power supply provides coupling of the first transformer winding in the first power converter to the second winding in the second power converter stage. Series connectivity of the first winding and the second winding provided by the circuit path creates a trans-inductance path between the first power converter stage and the second power converter stage.

23 Claims, 17 Drawing Sheets

(51) Int. Cl.
H02M 3/07 (2006.01)
H02M 3/158 (2006.01)

(52) U.S. Cl.
CPC ......... H02M 1/009 (2021.05); H02M 1/0095 (2021.05); H02M 3/07 (2013.01); H02M 3/072 (2021.05); H02M 3/158 (2013.01); H02M 3/1584 (2013.01)

(58) Field of Classification Search
CPC .......... H02M 3/07; H02M 3/072; H02M 3/15; H02M 3/1584; H02M 3/335–33592; H02M 3/33507; H02M 3/33569; H02M 7/12; H02M 7/21; H02M 7/217; H02M 7/219
See application file for complete search history.

(56) References Cited

U.S. PATENT DOCUMENTS

| | | | | |
|---|---|---|---|---|
| 2021/0288576 | A1 * | 9/2021 | Rizzolatti | H02M 1/007 |
| 2022/0109368 | A1 | 4/2022 | Zhou et al. | |
| 2022/0247204 | A1 * | 8/2022 | Pahlevaninezhad | H02J 3/381 |
| 2022/0263410 | A1 * | 8/2022 | Saggini | H02M 3/07 |
| 2023/0378874 | A1 * | 11/2023 | Ikriannikov | H02M 1/0064 |
| 2024/0088795 | A1 * | 3/2024 | Huang | H02M 3/33576 |

OTHER PUBLICATIONS

Jiawei Liang; Liang Wang; Minfan Fu; Junrui Liang; Haoyu Wang; "Overview of Voltage Regulator Modules in 48 V Bus-Based Data Center Power Systems"; Sep. 2022; CPSS; CPSS Transactions on Power Electronics and Applications; pp. 283-299 (Year: 2022).*

Youssef Elasser; Jaeil Baek; Minjie Chen; "A Merged-Two-Stage LEGO-PoL Converter with Coupled Inductors for Vertical Power Delivery"; Oct. 30, 2020; IEEE; 2020 IEEE Energy Conversion Congress and Exposition (ECCE) (Year: 2020).*

Elasser Youssef, et al, "A Merged-Two-Stage LEGO-PoL Converter with Coupled Inductors for Vertical Power Delivery", 2020 IEEE Energy Conversion Congress and Exposition (ECCE), IEEE, Oct. 11, 2020 (Oct. 11, 2020), pp. 916-923, XP03351293.

Extended European Search Report, EP 23 220 476.8, May 28, 2024, pp. 1-10.

* cited by examiner

POWER
SUPPLY
100-7

INDUCTIVE COUPLED MUTI-STAGE POWER CONVERTER

BACKGROUND

Data centers provide services to many companies and consume around 2-3% of the global electricity consumption. Data center operators are hence continuously looking to improve the efficiency of the power conversion from AC to Point-of-Load or to increase the computational power of CPU/GPU/ASIC etc. in existing data centers. Implementation of machine learning and artificial intelligence, and specifically the training systems, require very powerful GPUs or custom designed ASICS to fulfil highest computational power requests.

Data center equipment typically operates with a 48 VDC input voltage or alternatively with a variable 40 VDC to 60 VDC input voltage instead of a common 12 VDC bus because this higher DC voltage offers several advantages such as lower distribution losses within the rack and on the motherboard. There are multiple conventional ways of providing higher power per rack and higher power per board such as based on conversion of a respective input voltage into one or more output voltages.

One type of conventional power converter is a so-called Trans-Inductor Voltage Regulator (TLVR). In general, a so-called TLVR may include multiple power converter phases, each of which includes a multi-winding transformer. A first winding of each power converter phase (such as a buck converter configuration) is connected in series, providing coupling amongst the multiple phases. A second winding of each phase contributes to producing a respective output voltage the powers a load.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. Regardless of whether energy is received from green energy sources or non-green energy sources, it is desirable to make most efficient use of raw energy provided by such systems to reduce our impact on the environment. This disclosure contributes to reducing our carbon footprint and better use of energy via more efficient energy conversion.

In view of the above desire to provide more efficient power conversion, this disclosure includes novel ways of providing improved performance of a voltage converter operable to generate a corresponding output voltage.

More specifically, according to one embodiment, an apparatus (such as a power supply) includes one or more of a first power converter stage, a second power converter stage, and a circuit path. The first power converter stage includes a first transformer winding used to convert an input voltage into an intermediate voltage. The second power converter stage includes a second transformer winding and receives the intermediate voltage. Via the received intermediate voltage, the second power converter stage produces an output voltage to power a load. The circuit path provides coupling of the first transformer winding in the first power converter stage to the second transformer winding in the second power converter stage.

The first transformer winding may be a secondary winding of a first transformer disposed in the first power converter stage. A corresponding primary winding of the first transformer (magnetically coupled to the secondary winding of the first transformer) is operative to produce the intermediate voltage. The second transformer winding may be a secondary winding of a second transformer disposed in the second power converter stage. The primary winding of the second transformer (magnetically coupled to the secondary winding of the second transformer) is operative to produce the output voltage.

The circuit path may connect the first transformer winding and the second transformer winding in series. The circuit path may provide trans-inductance voltage regulation between the first power converter stage and the second power converter stage.

The circuit path as discussed herein may convey first current from the second winding in the second power converter stage to the first winding in the first power converter stage. A magnitude of the first current may vary depending on a variation of a magnitude of output current supplied by the output voltage to the load. The magnitude of the first current conveyed by the circuit path may, at least in part, control generation of the intermediate voltage by the first power converter stage.

Note further that the second power converter stage may include a first sub-stage and a second sub-stage connected in parallel to receive the intermediate voltage and convert the intermediate voltage into the output voltage. The second sub-stage may include the second winding. The apparatus as further discussed herein may include a controller operative to adjust apportionment of first power (such as current) supplied by the first sub-stage and second power supplied by the second sub-stage to produce the output voltage depending on variations in a magnitude of the output current supplied by the output voltage to power a load. In other words, as further discussed herein, during transient conditions, the controller can be configured to operate the second sub-stage to provide additional current to the load. Conversely, during steady-state conditions in which the output current consumed by the load is relatively constant, the controller can be configured to operate the first sub-stage to provide most if not all of the output current to power the load.

The input voltage received by the first power converter stage may be a first input voltage; the second power converter stage may include a first sub-stage operative to receive the intermediate voltage and convert the intermediate voltage into the output voltage. The second power converter stage may further include a second sub-stage (such as including the second transformer winding) operative to receive a second input voltage and convert the second input voltage into the output voltage, the second input voltage may be independent of the first input voltage. The second input voltage may be greater in magnitude than the first input voltage.

The apparatus as discussed herein may further include a third transformer winding disposed in the first power converter stage. The third transformer winding may be electrically coupled to the first winding. The third transformer winding may contribute to generation of the intermediate voltage via first current supplied by the third transformer winding. The apparatus may further include a fourth transformer winding disposed in the second power converter stage. The fourth transformer winding may be electrically coupled to the second transformer winding; the fourth transformer winding may be configured to generate the output voltage via second current supplied by the fourth transformer winding.

The apparatus as further discussed herein may include any number of transformer windings such as the first transformer winding, second transformer winding, a third transformer winding and a fourth transformer winding. The third transformer winding may be disposed in series with the first winding. The fourth transformer winding may be disposed in series with the second transformer winding. In such an instance, the circuit path provides series connectivity of the first winding, the second winding, the third winding, and the fourth winding. Note that each of the different transformer windings may be associated with a respective different power converter phase.

In further examples, the apparatus includes an inductor component disposed in series with the first winding and the second winding via the circuit path. The inductor component may control a transient response of the second power converter stage producing the output voltage.

The circuit path can be configured to create a series circuit loop including an inductor component, the first winding, and the second winding. If desired, one or more nodes of the series circuit loop may be coupled to a ground reference voltage.

In accordance with another example as discussed herein, if isolation is required or desired, the first power converter stage may be isolated with the inductor (such as transformer winding) disposed at secondary side electrically coupled to the second stage. The windings (such as inductors) electrically coupled between first and second stage may be referenced with respect to a common GND.

The second power converter stage may include a first sub-stage and a second sub-stage, each of which is connected to a common output node of the second power converter stage to produce the output voltage. The first power converter stage may be an unregulated or regulated voltage converter stage; the first sub-stage of the second power converter stage may be an unregulated power converter stage. As discussed herein, one with DR-HSC (a regulated converter) and RHSC (another regulated converter). The first power converter may be any regulated topology inductor based. The second sub-stage of the second power converter stage may be a voltage regulated power converter stage providing regulation of generating the output voltage. The second sub-stage may be operative to increase a first current outputted from the second sub-stage to produce the output voltage in response to detecting a transient load condition, the increased first current causing an increased flow of second current through a series combination of the second winding, the circuit path, and the first winding. The increased flow of the second current through the series combination may be operative to increase a third current supplied by the intermediate voltage from the first power converter stage to the second power converter stage. The increasing current causes the first sub-stage of the second power converter stage to supply more output current to the load.

Further examples herein include a method comprising: via a first power converter stage including a first transformer winding, converting an input voltage into an intermediate voltage; via a second power converter stage including a second transformer winding: i) receiving the intermediate voltage, and ii) producing an output voltage, the second power converter; and via a circuit path coupling the first winding and the second winding, controlling generation of the intermediate voltage by the first power converter stage.

As previously discussed, the second power converter stage may include a first sub-stage and a second sub-stage connected to a common output node from which the output voltage is outputted, the second sub-stage including the second winding. The method may further include: via the first sub-stage of the second power converter stage, providing steady state power output to the output node to generate the output voltage; and via the second sub-stage of the second power converter stage, providing transient power output to the output node to generate the output voltage during transient current consumption conditions associated with the load.

In still further examples, the method may include: detecting a variation in a magnitude of an output current supplied by the output voltage to power a load; and in response to the variation, adjusting apportionment of first power supplied by the first sub-stage and second power supplied by the second sub-stage to produce the output voltage.

These and other more specific embodiments are disclosed in more detail below.

In addition to potentially being implemented as an analog controller and corresponding analog circuitry/components as described herein, note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, firmware, and/or other data (e.g., data structures) arranged or encoded on a non-transitory computer readable storage medium such as an optical medium (e.g., CD-ROM), floppy disk, hard disk, memory stick, memory device, etc., or other a medium such as one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load. The instructions, when executed by computer processor hardware, cause the computer processor hardware to: control operation of a first power converter stage including a first transformer winding, the first power converter stage converting an input voltage into an intermediate voltage; control operation of a second power converter stage including a second transformer winding, wherein the second power converter stage is operative to: i) receive the intermediate voltage, and ii) produce an output voltage, the second power converter; and wherein a circuit path coupling the first winding and the second winding controls generation of the intermediate voltage by the first power converter stage.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling switches in a power supply operable to generate an output voltage, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
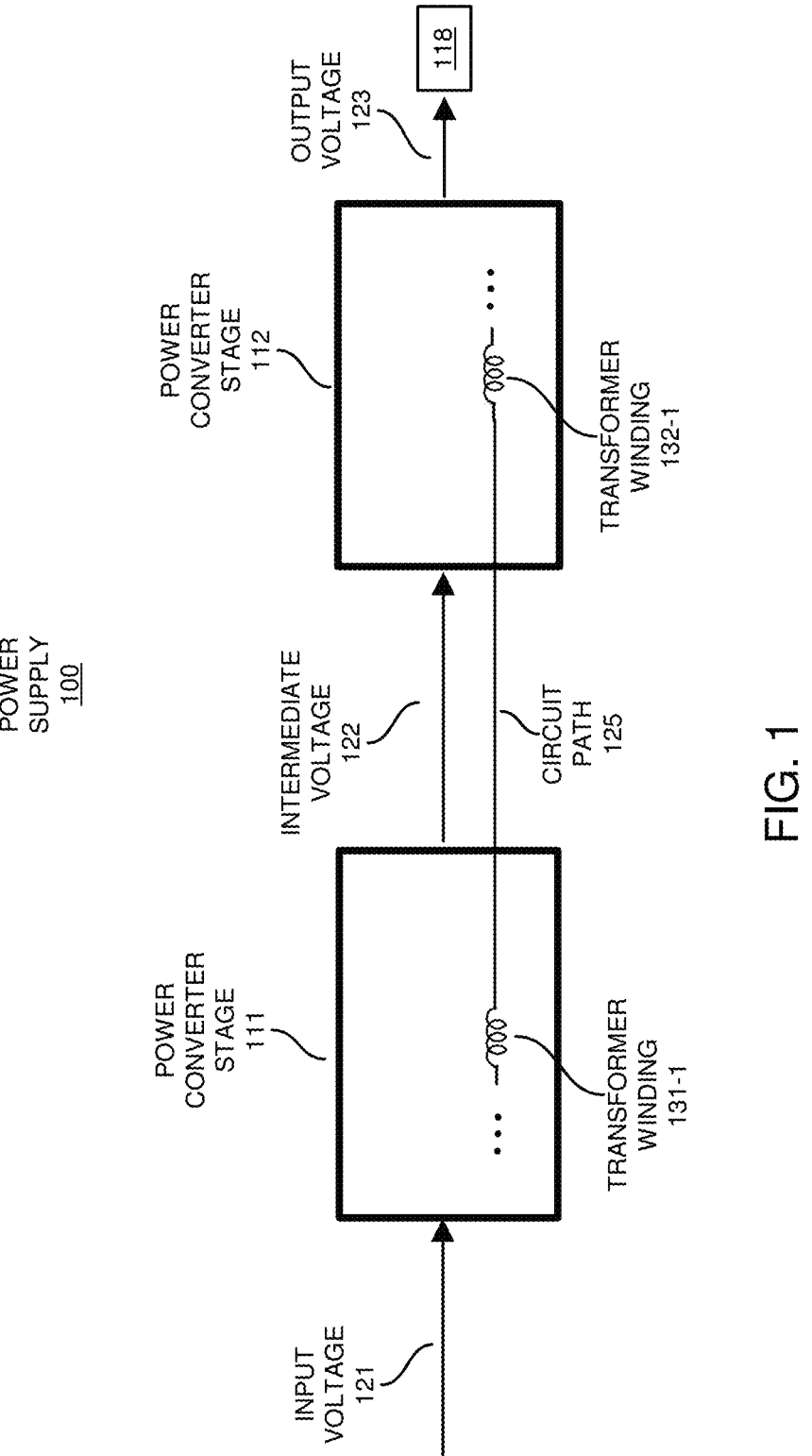
FIG. 1 is an example general diagram illustrating a power supply in multiple power converter stages operable to produce an output voltage to power a load as discussed herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A power supply includes a first power converter stage and a second power converter stage. The first power converter stage includes a first transformer winding (a.k.a., a first inductor component); the second power converter stage includes a second winding (a.k.a., a second inductor component). The first power converter stage and corresponding first transformer winding converts an input voltage into an intermediate voltage. A first sub-stage of the second power converter stage converts the intermediate voltage into first current supplied to the load; the first current contributes to generation of the output voltage. A second sub-stage of the second power converter stage outputs second current supplied to the load; the second current contributes to generation of the output voltage. A circuit path in the power supply provides coupling of the first transformer winding in the first power converter to the second winding in the second power converter stage. In one example, series connectivity of the first winding and the second winding provided by the circuit path creates a trans-inductance path between the first power converter stage and the second power converter stage, providing better power conversion of an input voltage into an output voltage.

As further as discussed herein, a more particular examples, this disclosure proposes a two-stage converter system combining very high efficiency first power converter stage with a very high transient response second power converter stage. High efficiency is achieved through processing the majority of power by non-regulating or regulating one or more power converter stages. High transient response is achieved by an additional power converter stage disposed in parallel with a second power converter stage. This parallel converter in the second power converter stage (such as a first sub-power converter stage and a second sub-power converter stage) is electrically coupled to the first power converter stage to effectively lower the impedance of the first power converter stage.

One example as discussed herein implements a Regulated Hybrid Sigma Converter as a first power converter stage and a second power converter stage including a Hybrid Sigma Converter (acting as a current multiplier) in parallel with a Trans-Inductance Voltage Regulator. Other examples include different configurations of power converter stages of different types.

Note further that the techniques as discussed herein can be generalized and implemented into any converter topology being used as first converter having an inductive element.

Now, more specifically, FIG. 1 is an example general diagram illustrating a power supply as discussed herein.

As shown in this example, power supply 100 (such as an apparatus, electronic device, power system, multistage power converter, etc.) includes multiple power converter stages such as power converter stage 111 and power converter stage 112. The power converter stage 111 includes transformer winding 131-1. The power converter stage 112 includes transformer winding 132-1. The circuit path 125 provides connectivity between the transformer winding 131-1 and the transformer winding 132-1. For example, the circuit path 125 may connect the first transformer winding 131-1 and the second transformer winding 132-1 in series.

In general, during operation, the power converter stage 111 receives input voltage 121 and generates corresponding intermediate voltage 122. Power converter stage 112 receives the intermediate voltage and converts it into the output voltage 123 to power the load 118. The load 118 consumes different amounts of current over time.

As further discussed herein, the circuit path 125 provides advantageous coupling of the transformer winding 131-1 and the transformer winding 132-1 to produce, in a novel manner, the output voltage 123. The power converter stage 111 may include any number of transformer windings serially connected to any number of transformer windings in the power converter stage 112. Examples of different circuits implementing interconnected transformer windings to produce the output voltage 123 are further discussed below via the following FIGS.

Figure 2:
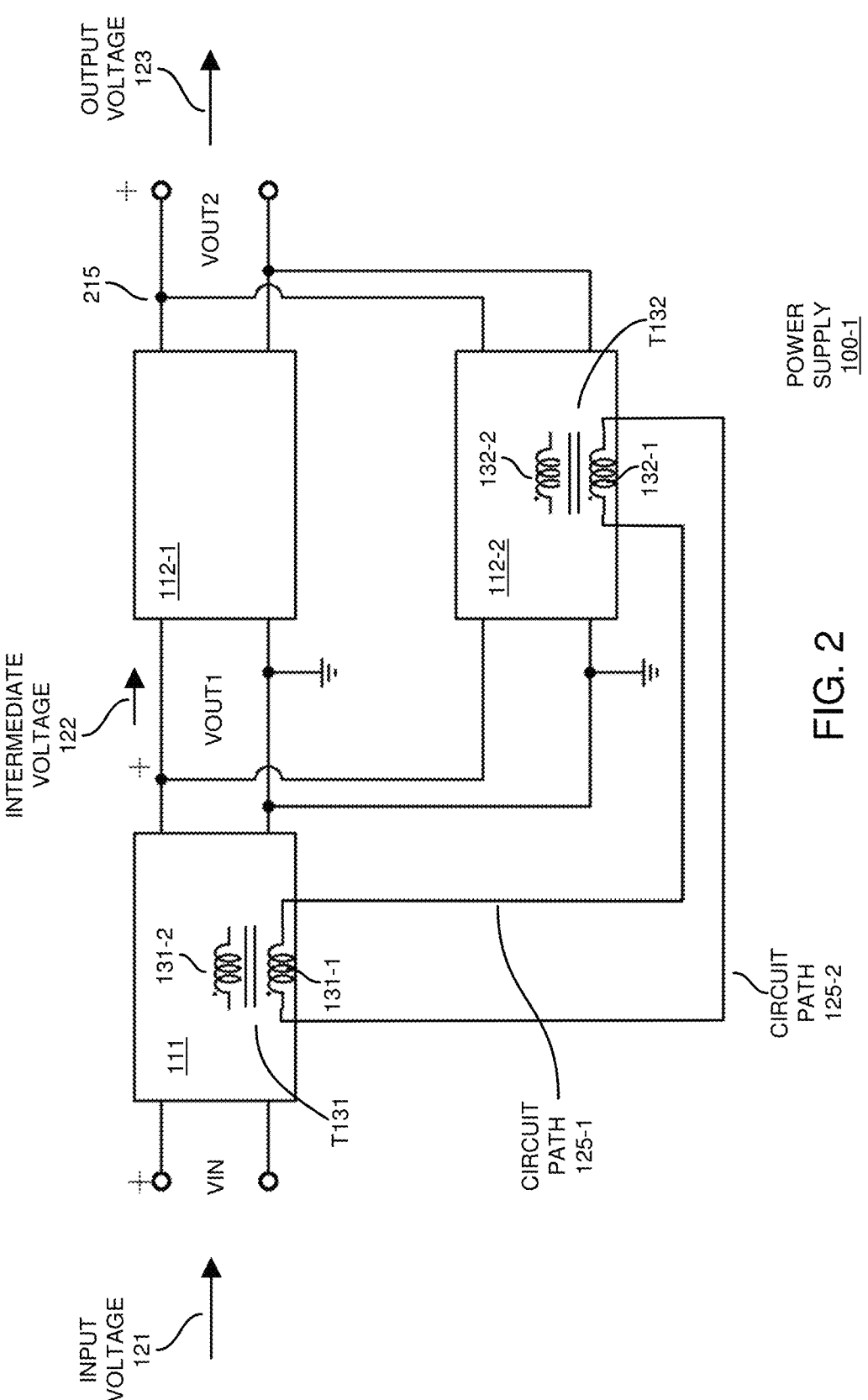
FIG. 2 is an example diagram illustrating a more detailed rendition of a power supply and corresponding interconnectivity of multiple power converter stages as discussed herein.

FIG. 2 is an example diagram illustrating a more detailed rendition of a power supply and corresponding interconnectivity of multiple power converter stages as discussed herein.

Thus, this disclosure includes a power supply architecture such as power supply 100-1 including three distinct converter stages: a $1^{st}$ stage power supply (power converter stage 111) providing regulation to produce an intermediate voltage 122 (a.k.a., VOUT1), a $2^{nd}$ stage power supply such as power converter stage 112-1 coupled between the first power converter stage 111 and an output node 215 of the power converter stage 112 producing the output voltage 123. The output voltage 123 such as a DC voltage (a.k.a., VOUT2) may deliver power to a load 118 at a voltage such as below 1 VDC, although the output voltage 123 may be any suitable value. As further shown, the power supply 100-1 includes a $3^{rd}$ stage power supply (power converter stage 112-2) coupled between the first power converter stage 111 and the output node 215 that produces the output voltage 123. In this example, the power converter stage 112-1 and is disposed in parallel with the power converter stage 112-2 to produce the respective output voltage 123.

Thus, the power converter stage 112 can be configured to include a first sub-stage (power converter stage 112-1) and a second sub-stage (such as power converter stage 112-2) connected in parallel to receive the intermediate voltage 122 and convert the intermediate voltage 122 into the output voltage 123. In this example, the second sub-stage 112-2 associated with the power converter stage 112 includes the second transformer winding 132-1.

Thus, both power converter stage 111 and power converter stage 112 include inductive elements (such as transformer winding 131-1 and transformer winding 132-1), which are electrically connected via circuit path 125-1 and/or circuit path 125-2 as shown.

The combination of circuit path 125-1 and circuit path 125-2 can be configured as a respective loop in which the transformer winding 131-1 (and potentially one or more other windings in the power converter stage 111) and the transformer winding 132-1 (impotence in one or more other windings in the power converter stage 112-2) are connected in series. The power converter stage 112-1 may be a capacitive divider without magnetic elements.

If desired, the power converter stage 112-1 does not provide regulation but acts basically as a voltage divider and current multiplier. The power converter stage 111 can be configured to provide regulation of the intermediate voltage 122 and hence regulates the output voltage 123, through the current multiplying of power converter stage 112-1. The power converter stage 112-2 may be used as a bandwidth booster by providing electrical boost current through the circuit path 125-1 to the first power converter stage 111.

As a more specific example of the power supply 100-1, the power converter stage 111 includes transformer T131. The transformer T131 includes transformer winding 131-1 magnetically coupled to the transformer winding 131-2. As further discussed herein, the first power converter stage 111 implements appropriate circuitry that flows through the transformer winding 131-2 to produce the respective intermediate voltage 122. Current through the circuit path 125-1 and the transformer winding 131-1 provide a respective positive or negative boost associated with the generation of current through the winding 131-2 to produce the intermediate voltage 122. Thus, the transformer winding 131-1 may be considered a secondary winding of the transformer T131 disposed in the power converter stage 111; the transfer winding 131-2 may be considered is a primary winding of the transformer T131 disposed in the power converter stage 111. As previously discussed, current through the transformer winding 131-2 contributes to generation of the intermediate voltage 122.

Yet further, the circuit path 125-1 and/or circuit path 125-2 conveys current from the transformer winding 132-1 in the second power converter stage 112-2 to the winding 131-1 in the first power converter stage 111; a magnitude of the first current conveyed through the circuit path 125 varies depending on a variation of a magnitude of output current supplied by the output voltage 123 to the load 118. For example, the power converter stage 112-2 includes the transformer T132 and corresponding transformer winding 132-2 to generate and control a magnitude the output voltage 123 to a desired setpoint voltage such as via regulation. In such an instance, the magnitude of the current outputted from the power converter stage 112-2 varies as needed to produce the output voltage 123 and a desired DC setpoint reference voltage. For example, during steady-state operating conditions, as further discussed herein, the power converter stage 112-1 provides most of the current to power the load 118, while the power converter stage 112-2 provides a relatively small amount of current to load. However, if the load 118 experiences a respective transient condition in which the load 118 suddenly consumes much more current, the power converter stage 112-2, because it provides regulation, outputs more current such as through the transformer winding 132-2 to produce and maintain a magnitude of the output voltage 123 at the desired setpoint reference voltage.

As further discussed herein, via magnetic coupling associated with transformer T132, the increased current through the transformer winding 132-2 during the transient load condition increases a magnitude of the current through the transformer winding 132-1. The increase in current provided by the transformer winding 132-1 through the circuit path 125-2/125-1 passes through the transformer winding 131-1. The energy associated with the increase in current through the circuit path 125-1 and/or circuit path 125-2 causes the transfer of energy from the transformer winding 131-1 to the transformer winding 131-2. The corresponding transferred energy from transformer winding 131-1 to transformer winding 131-2 causes an increase in the magnitude output current of the power converter stage 111 to produce the intermediate voltage 122 (or output current) as needed to account for the transient load condition as previously discussed. The power converter stage 112-1 then receives the increased current from the power converter stage 111. The increase in current received from the power converter stage 111 causes the power converter stage 112-1 to increase a magnitude of the respective current outputted from the power converter stage 112-1 to produce the output voltage 123 and maintain a magnitude of the output voltage 123 at a desired setpoint reference voltage.

Thus, the power converter stage 112-2 can be configured to provide at least 2 functions during a transient increase in current consumed by the load 118. For example, firstly, the power converter stage 112-2 itself via the transformer winding 132-2 increases the amount of output current to produce the output voltage 123 to accommodate the increased current consumed by the load 118. Secondly, the inductive coupling of the transformer winding 132-2 to the transformer winding 132-1, increased current supplied by the transformer winding 132-2 to maintain the output voltage 123 at the appropriate setpoint reference level results in a proportional amount of energy transfer from the winding 132-2 to the transformer winding 132-1, resulting in current flow through the circuit path 125 as previously discussed. The conveyance of the corresponding current through the circuit path 125 causes a respective flow of the same current through the transformer winding 131-1. This increased amount of current through the transfer winding 131-1 causes the transformer winding 131-2 to either suddenly increase its amount of output current conveyed to the power converter stage 112-1 or decrease its amount of output current conveyed to the power converter stage 112-2 depending upon a direction of the current flow through the transformer winding 131-1.

Accordingly, the magnitude of the current conveyed by the circuit path 125 at least in part controls generation of the intermediate voltage 122 and corresponding output current generated by the power converter stage 111. It is further noted that the configuration of the circuit path 125 and corresponding transformer windings work in the same direction. That is, when the power converter stage 112-2 suddenly outputs extra output current to produce the output voltage 123, the current through the circuit path 125 causes the power converter stage 111 to increase the amount of output current used to produce the intermediate voltage 122 in turn causing the power converter stage 112-1 to increase its output current to produce the output voltage 123 as well. Conversely, when the power converter stage 112-2 suddenly decreases magnitude of its output current to produce the output voltage 123, the negative current through the circuit path 125 causes the power converter stage 111 to decrease the amount of output current used to produce the intermediate voltage 122 in turn causing the power converter stage 112-1 to decrease its output current to produce the output voltage 123 as well. In such an instance, the voltage regulation provided by the power converter stage 112-2 controls operation of the power converter stages 111 and 112-1.

Figure 3:
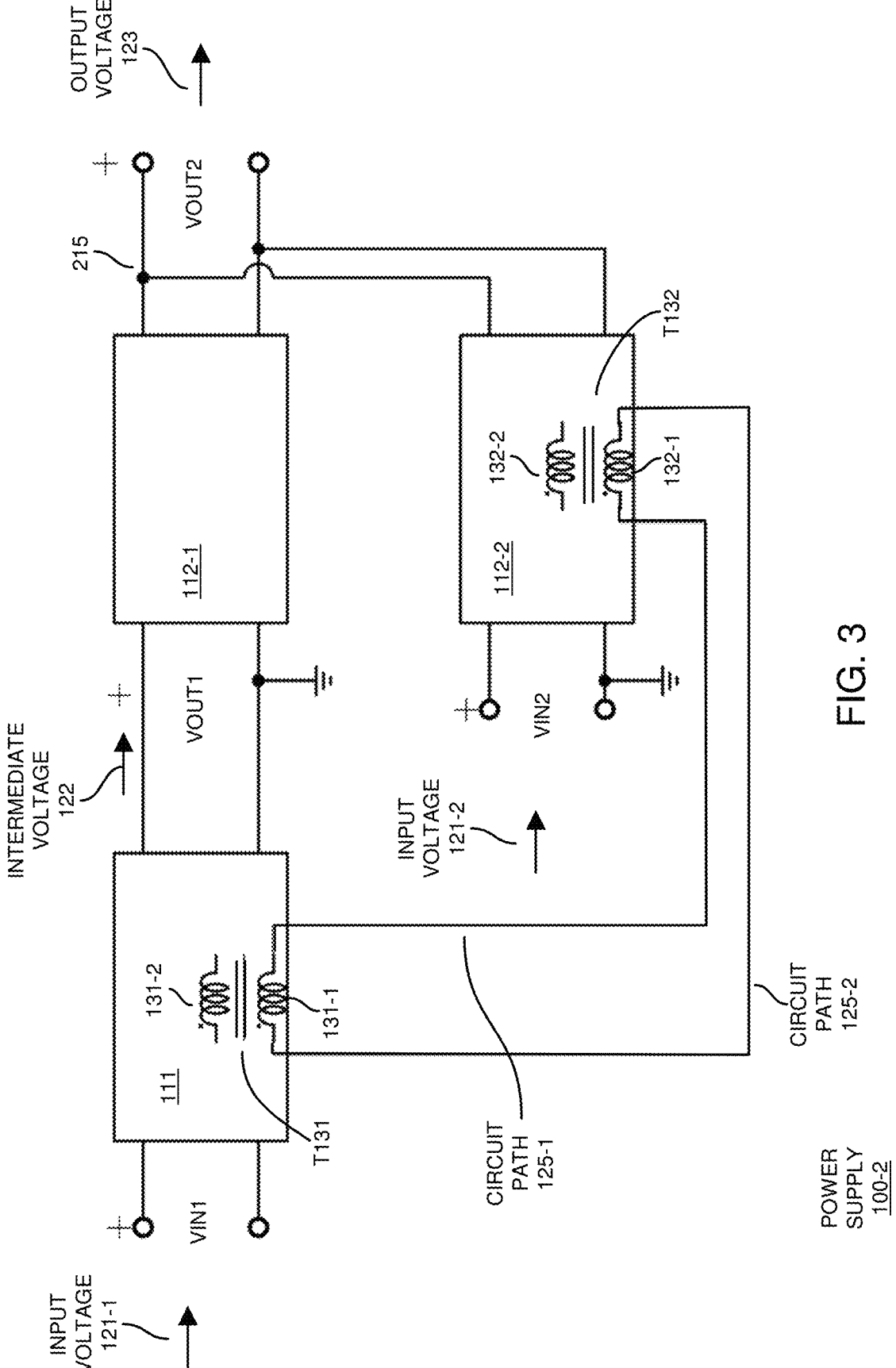
FIG. 3 is an example diagram illustrating a rendition of a power supply and corresponding connectivity of multiple power converter stages as described herein.

FIG. 3 is an example diagram illustrating a rendition of a power supply and corresponding connectivity of multiple power converter stages as described herein.

As shown in FIG. 3, alternative power architectures can be implemented to produce the respective output voltage 123 to power the load 118. However, in this particular configuration is shown in FIG. 3, the power converter stage 111 receives the input voltage 121-1 to produce the intermediate voltage 122. Additionally, the power converter stage 112-2 receives the input voltage 121-2 (a.k.a., VIN2) to produce the output voltage 123. Accordingly, it is not necessary that both the power converter stage 111 and the power converter stage 112-2 receive the same input voltage to produce a respective output voltage (or output current). In the example circuit of FIG. 3 may be useful in certain conditions in which it is desired to input a higher voltage into the power converter stage 112-2 for dealing with transient load jumps. The magnitude of the input voltage 121-1 (such as a first DC input voltage) and the magnitude of the input voltage 121-2 (such as a second DC input voltage) can be any suitable values.

Thus, the power supply 100-2 may be configured to receive a first input voltage 121-1 and second input voltage 121-2. The second power converter stage 112 includes a first sub-stage 112-1 operative to receive the intermediate voltage 122 and convert the intermediate voltage 122 into the output voltage 123. The second power converter stage 112 includes a second sub-stage 112-2 operative to receive a second input voltage 121-2 and convert the second input voltage 121-2 into the output voltage 123. If desired, the second input voltage 121-2 is greater in magnitude than the first input voltage 121-1.

Figure 4:
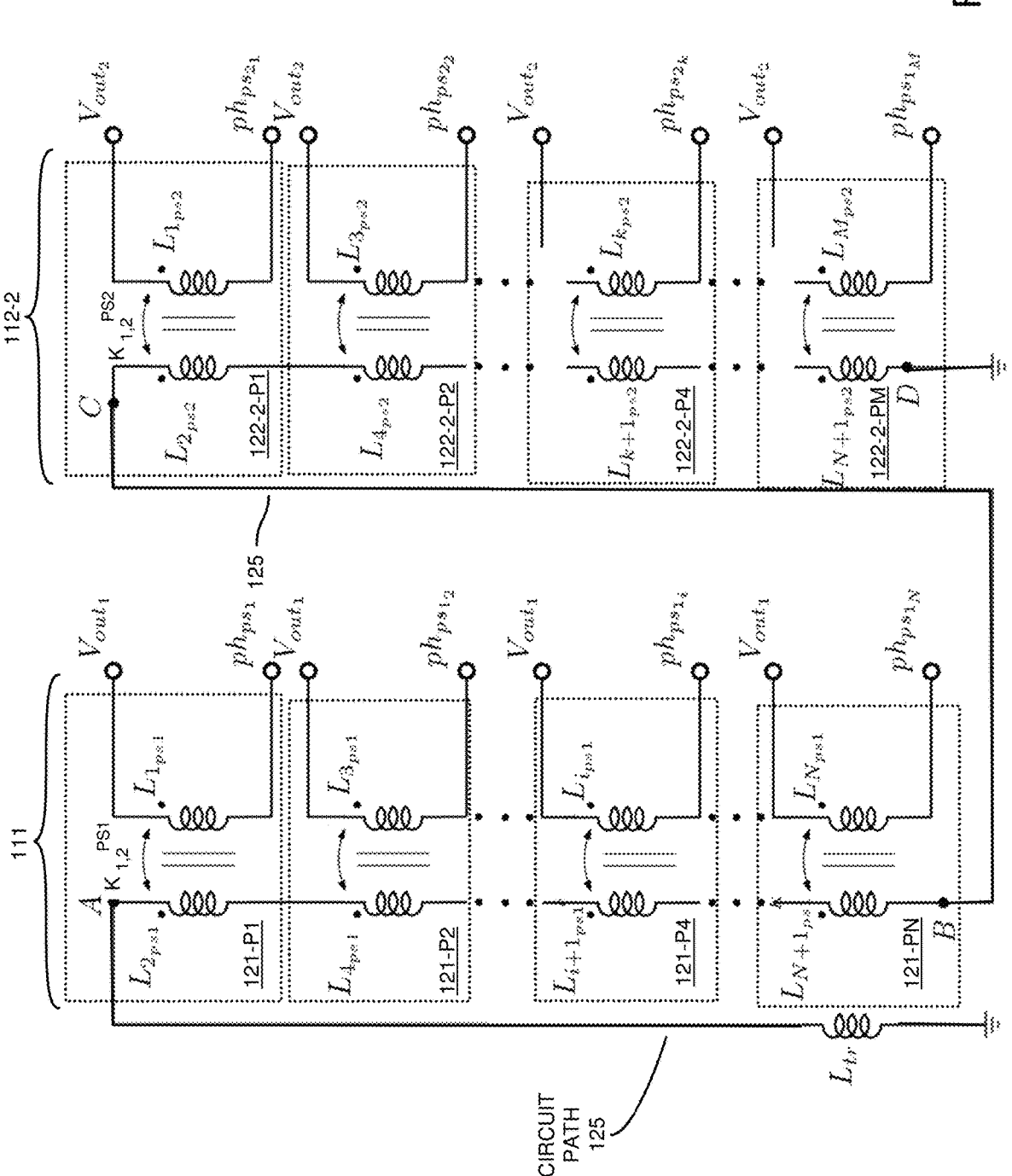
FIG. 4 is an example diagram illustrating trans-inductor interconnectivity of multiple transformer windings amongst different power stages as described herein.

FIG. 4 is an example diagram illustrating trans-inductor interconnectivity of multiple transformer windings amongst different power stages as described herein.

In this example, the power supply PS2 refers to the power converter stage 112-2; the power supply PS3 refers to the power converter stage 112-1; the power supply PS1 refers to power converter stage 111. Assume that the load 118 is being supplied by two stages (ps2 and ps3), being both supplied from either power supply ps1 or alternatively power supply ps2 being powered from an additional input voltage. FIG. 4 shows a connection between power supply ps1 (N phases) and power supply ps2 (M phases) using a trans-inductor (circuit path 125) for multi-stage power supplies, wherein the two power supplies are not powering the same load (i.e.

ps1 is powering $V_{out1}$ and ps$_2$ is powering $V_{out2}$). As shown in FIG. 4, each switching node ps$_{ps1_i}$ and ps$_{ps2_k}$ are connected to one or multiple switches which are producing the two output voltages $V_{out1}$ and $V_{out2}$. Power supply ps1 has at least one phase the premises such as including phase 121-P1, phase 121-P2, . . . , phase 121-P4, . . . phase 121-PN), where each phase is defined by switching node ph$_{ps1_i}$.

When multi-phase operation is used, all the phases are coupled via circuit path 125 to enhance the current slew rate during a variation of the RMS voltage on each switching node ph$_{ps1_i}$. Power converter stage 112-2 includes one or multiple phases, where each phase is defined by switching node ph$_{ps1_i}$; when multi-phase operation is realized all the phases in power converter stage 112-2 are coupled via circuit path 125 to enhance the current slew rate during a variation of the RMS voltage on each switching node ph$_{ps2_k}$.

Power converter stage 111 and power converter stage 112-2 are then coupled through an electrical connection between ground, node A, node B, node C and again ground (i.e. defined by node D). In further examples, note that additional inductor Ltr in circuit path 125 between node A and node D, $L_{tr}$, provides better control of the coupling between all the phases forming the proposed trans-inductor multi-stage power supply as discussed herein. Note that the inductor Ltr can be a saturable inductor designed in order to have a high value of inductance during the steady state mode (such as before time T1 and after time T2 in FIG. 11) and a low inductance value during the transient mode (such as all or a portion of the time between time T1 and time T2 of FIG. 11).

Figure 5:
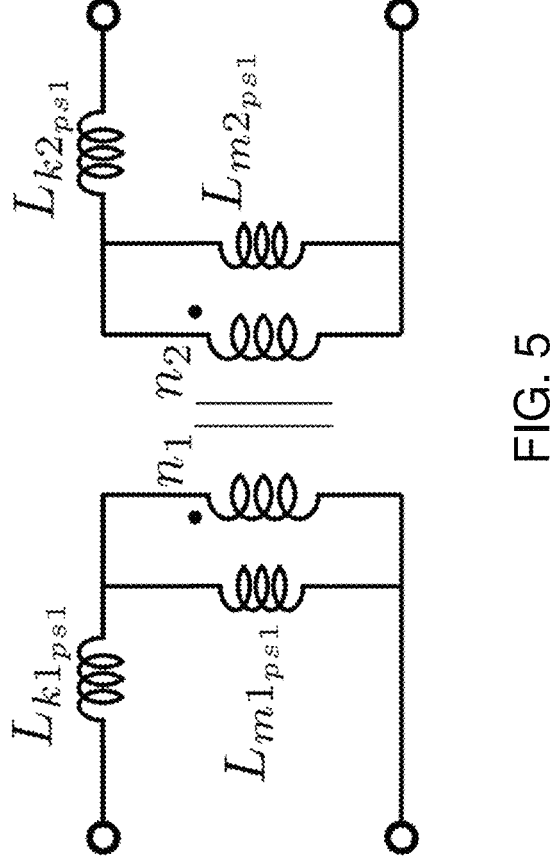
FIG. 5 is an example diagram illustrating an equivalent model of one elemental transformer of the first and/or second power converter stage (any power converter stage) as described herein.

Referring again to FIG. 4, note that a trans-inductor implementation for a multi-stage power architecture presents multiple transformers corresponding windings connected as in FIG. 4, where each transformer (i.e. transformer connected to node A) can be described by the following model, as any classic transformer with a certain coupling (between primary and secondary windings) and with a magnetizing inductance. As shown in FIG. 5 (such as an example diagram illustrating an equivalent model of one elemental transformer of the first power converter stage 111 or other power converter stage is described herein), which illustrates a respective model associated with each element in FIG. 4, it is possible to derive the following model:

$$L_{m1} = k_{1,2_{ps1}} L_1 \qquad (1)$$

$$L_{k1} = \left(1 - k_{1,2_{ps1}}\right) L_1 \qquad (2)$$

$$L_{m2} = k_{1,2_{ps1}} L_2 \qquad (3)$$

$$L_{k2} = \left(1 - k_{1,2_{ps1}}\right) L_2 \qquad (4)$$

The turns ratio of the transformer has the following relation, with $k_{ps1} > 0$:

$$\frac{L_{m1}}{L_{m2}} = \left(\frac{n_1}{n_2}\right)^2 \qquad (5)$$

After the model analysis, summarized through equations (1) to (5) above, it is clear that each phase node ph$_{ps1_i}$ and ph$_{ps2_k}$ generates an induced voltage output proportional to the voltage being imposed by all the phases. This may be useful in desirable since each phase is boosting the others, and the boosting effect is delivering increased power to two different DC loads.

The turns ratio of transformers in each single phase, forming the two power supplies ps1 (also known as power converter stage 111) and ps2 (also known as power converter stage 112-2), can be different. The current inside the loop formed by circuit path 125, as shown in FIG. 4, may contain AC ripple, allowing therefore the interconnection between nodes B and C within a long distance in the board without concerns on high DC current losses. Hence, power supply ps1 (power converter stage 111) and power supply ps2 (power converter stage 112-2) can be disparately located with respect to each other. In general, by looking at the polarity of each transformer forming the trans-inductor multi-stage circuitry shown in FIG. 4, it is shown that all the inductances between ph$_{ps1_i}$ and $V_{out1}$ and between ph$_{ps2_k}$ and $V_{out2}$ are achieving inverse coupling among themselves. With this solution, a high-speed low-voltage buck converter boosts a converter residing at the higher voltage domain (i.e. switching at lower switching frequency with higher inductance value).

Note further that the architecture as discussed herein can be implemented when converters such as power converter stage 111 and power converter stage 112-2 are based on/include inductors, as this allows to connect them with the trans-inductor circuit configured as further discussed below. As previously introduced, the power converter stage 112-1 (such as ps3) acts as a voltage divider/current multiplier circuit to produce the respective output voltage 123, as this approach creates a low-impedance power distribution. Note that any topology including an inductor (oriented to power the corresponding converter output) could be connected in this way. Additional example cases are discussed below.

Figure 6:
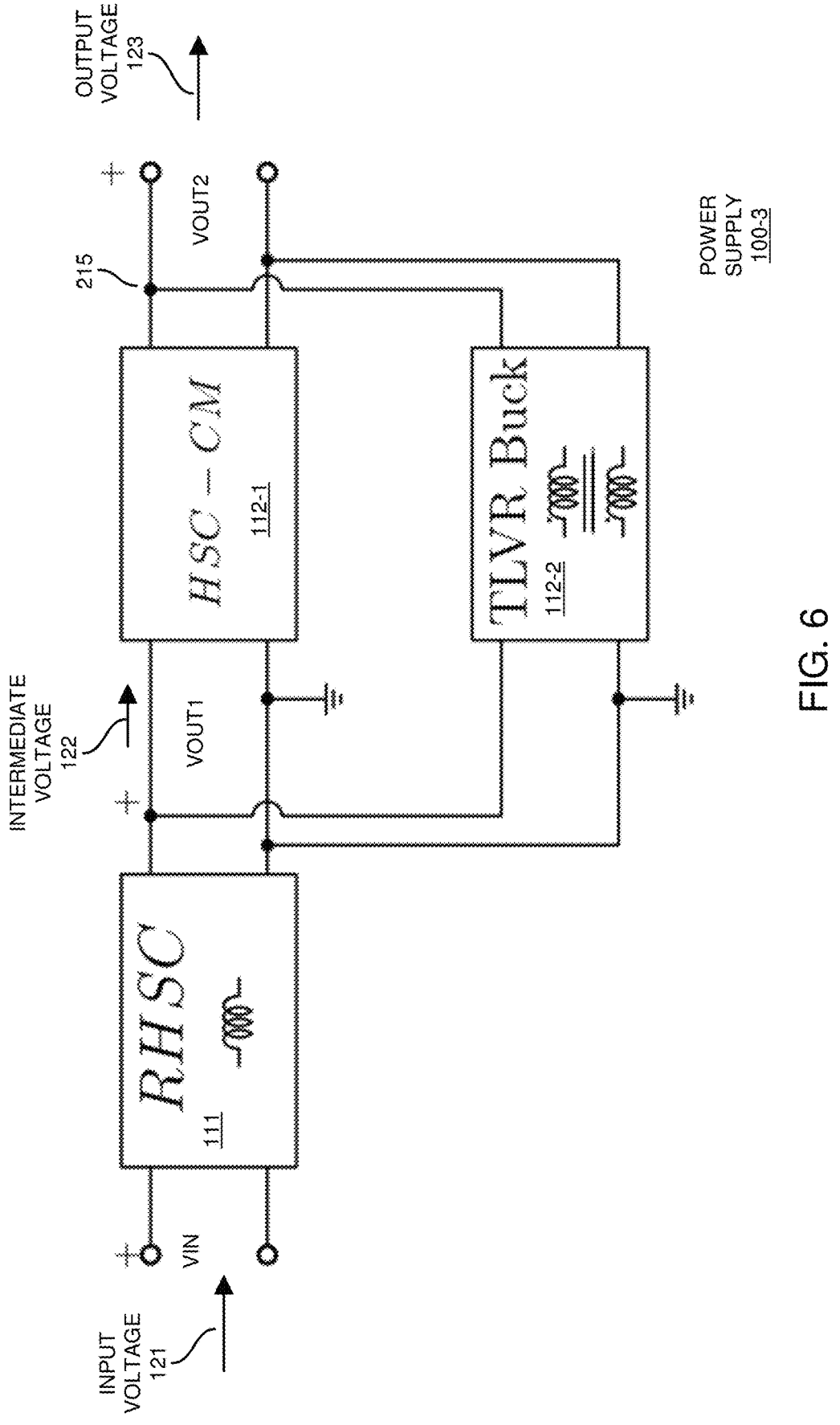
FIG. 6 is an example diagram illustrating implementation of a regulated hybrid switch capacitor converter and a combination of a TLVR buck converter in parallel with a hybrid switch capacitor converter-current multiplier as described herein.

FIG. 6 is an example diagram illustrating implementation of a regulated hybrid switch capacitor converter and a TLVR buck converter in parallel with a hybrid switch capacitor converter-current multiplier as described herein.

In this example of FIG. 6, the power converter stage 112-2 is implemented as a TLVR (Trans-Inductor Voltage Regulator) buck converter, which is disposed in parallel with the power converter stage 112-1 such as a hybrid switch capacitor converter-current multiplier (HSC-CM). The HSC-CM is designed to handle most of the power between $V_{out1}$ and $V_{out2}$, and the TLVR buck is configured to handle regulation and transient response.

Further in this example, the power converter stage 111 is used to implement a preliminary step-down and to regulate $V_{out1}$ (a.k.a., intermediate voltage 122). The R-HSC (such as a Regulated Hybrid Switched Capacitor converter including an unregulated non-isolated converter or, more specifically, a Hybrid Switched capacitor converter) and an inductor based regulated converter. The similar manner as previously discussed, the power converter stage 112-1 and the power converter stage 112-2 each receive the intermediate voltage 122 to produce the output voltage 123.

Figure 7:
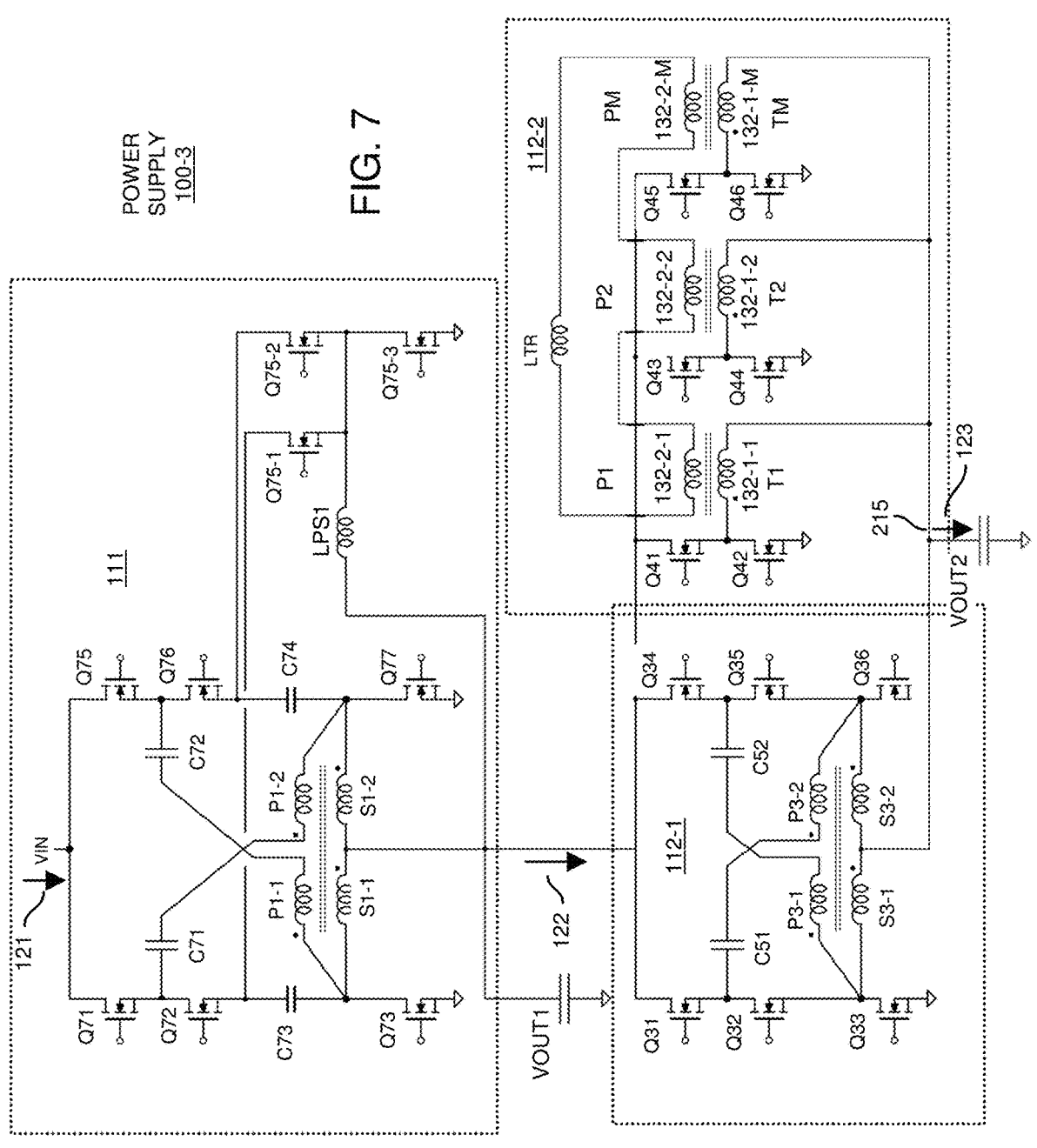
FIG. 7 is an example more detailed diagram illustrating a multi-stage power converter as described herein.

FIG. 7 is an example more detailed diagram (of FIG. 6) illustrating implementation of a regulated hybrid switch capacitor converter and a TLVR buck converter in parallel with a hybrid switch capacitor converter-current multiplier as described herein.

In this example, the power converter stage 111 is implemented as a regulated hybrid switched capacitor converter to produce the intermediate voltage 122 (VOUT1). The power converter stage 112-1 is implemented as a hybrid switched capacitor converter-current multiplier to convert the received intermediate voltage 125 into the output voltage 123 (VOUT2). Power converter stage 112-2 is implemented as a so-called multiphase TLVR buck converter including series connectivity of transformer windings $L_2$, $L_4$, etc., with inductor Ltr via circuit path 715. As shown, the circuit path 715 can be configured as a loop connecting each of the individual phases associated with the TLB R-buck converter (implementation of power converter stage 112-2).

Figure 8:
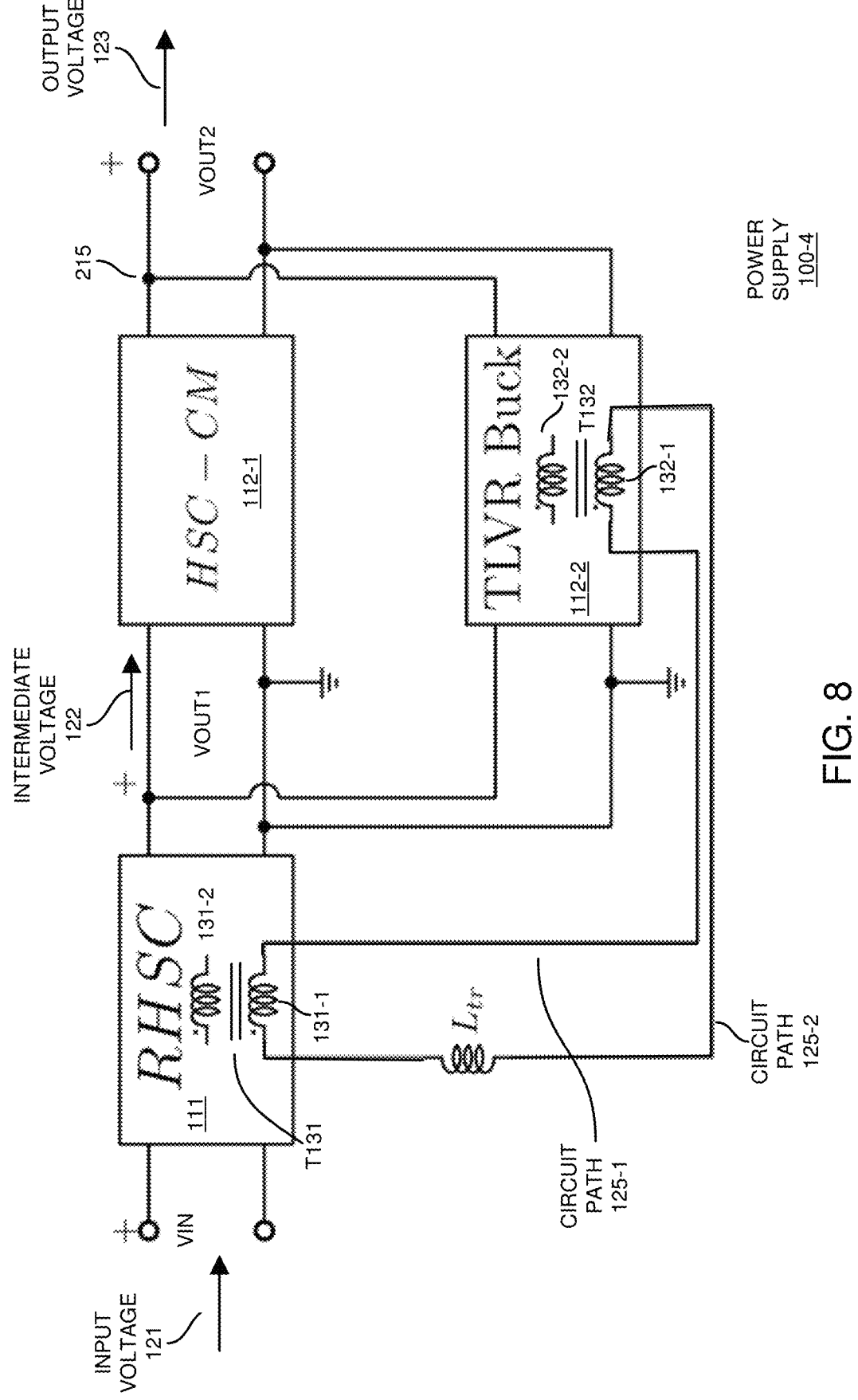
FIG. 8 is an example diagram illustrating implementation of a regulated hybrid switch capacitor converter and a TLVR buck converter in parallel with a hybrid switch capacitor converter-current multiplier as described herein.

FIG. 8 is an example diagram illustrating implementation of a regulated hybrid switched capacitor converter and a parallel combination of TLVR buck converter with a hybrid switch capacitor converter-current multiplier as described herein.

In this example of FIG. 8, the power converter stage 112-2 is implemented as a TLVR (so-called Trans-Inductor Voltage Regulator) buck converter, which is disposed in parallel with the power converter stage 112-1 such as implemented via a hybrid switch capacitor converter-current multiplier (HSC-CM). The HSC-CM (Hybrid Switched-Capacitor Converter—Current Multiplier) in this example may be designed to handle most of the power between $V_{out1}$ and $V_{out2}$, and the TLVR buck is configured to handle regulation and transient response conditions in which the respective load 118 suddenly increases its current consumption requiring in an appropriate response by the power converter stage 112-2 to immediately provide more current to the load to prevent the undervoltage of the output voltage 123 with respect to a desired setpoint reference voltage. Conversely, a sudden decrease in current consumption by the respective load 118 power by the output voltage 123 requires an appropriate response by the power converter stage 112-2 to immediately provide less current output to prevent an overvoltage condition of the output voltage 123 with respect to a desired setpoint reference voltage.

Further in this example, the power converter stage 111 is used to implement a preliminary step-down and to regulate $V_{out1}$ (a.k.a., intermediate voltage 122). The power converter stage 111 (R-HSC such as a Regulated Hybrid Switched Capacitor converter including an unregulated non-isolated converter or, more specifically, a Hybrid Switched capacitor converter) may be a transformer based power converter. In a similar manner as previously discussed, the power converter stage 112-1 and the power converter stage 112-2 each receive the intermediate voltage 122 to produce the output voltage 123.

The R-HSC circuit (power converter stage 111) may have a low bandwidth, and if desired, regulate a magnitude of the intermediate voltage 122. The power converter stage 112-2 (such as a so-called TLVR buck converter) can be current-controlled to ease the overall regulation scheme and may have high bandwidth (i.e., a fast transient response to produce output current). The power converter stage 112-1 (such as so-called HSC-CM) can be configured to behave like a DC-DC transformer with a given output impedance, and which handles most of the power to power the respective load 118, especially during steady-state conditions in which the output current provided by the output voltage 123 is fairly steady and unchanging. Thus, if desired, during steady-state conditions the HSC-CM provides more than 80 percent (or other suitable value) or up to the entire power transfer towards providing current to power the respective load 118 with the output voltage 123. As further discussed herein, during transient load conditions in which the load 118 suddenly increases or decreases current consumption, the power converter stage 112-2 (TLVR buck converter) is activated to immediately increase the respective output current supplied to the load 118; in such an instance, and at the same time based on respective feedback are current flow through the circuit path 125 to the power converter stage 111, the power converter stage 111 and downstream power converter stage 112-1 (HSC-CM) follow the response of the power converter stage 112-2 to provide additional current to the corresponding load 118.

More specifically, during a positive transient (load current increasing), the power converter stage 112-2 (TLVR buck converter) responds quickly to increment each phase duty-cycle: this action creates a boosting voltage at the secondaries $L_k^{ps2}$, causing a steep increase in current to manifest in the transient-line (i.e., circuit path 125) connecting the power converter stage 112-2 to the power converter stage 111.

Note again that the circuit path 125 can be configured to include an inductor component Ltr disposed in series with the one or more transformer windings of the power converter stage 112-2 and one or more transformer windings in the power converter stage 111 via the circuit path 125. A magnitude of the inductance associated with the inductor Ltr controls a transient response of the power converter stage 112-2 producing the output voltage 123.

As further shown, the circuit path 125 (such as circuit path 125-1 and circuit path 125-2) may create a series closed circuit loop including the inductor component Ltr, one or more transformer windings in the power converter stage 112-2, and one or more transformer windings in the power converter stage 111. As previously discussed, one or more nodes of the series circuit loop forms by the circuit path 125 and corresponding transformer windings may be coupled to one or more ground reference voltages.

Note further that the power converter stage 111 may be referenced with respect to a first ground reference voltage; the second power converter stage 112 may be referenced with respect to a second ground reference voltage.

Figure 9:
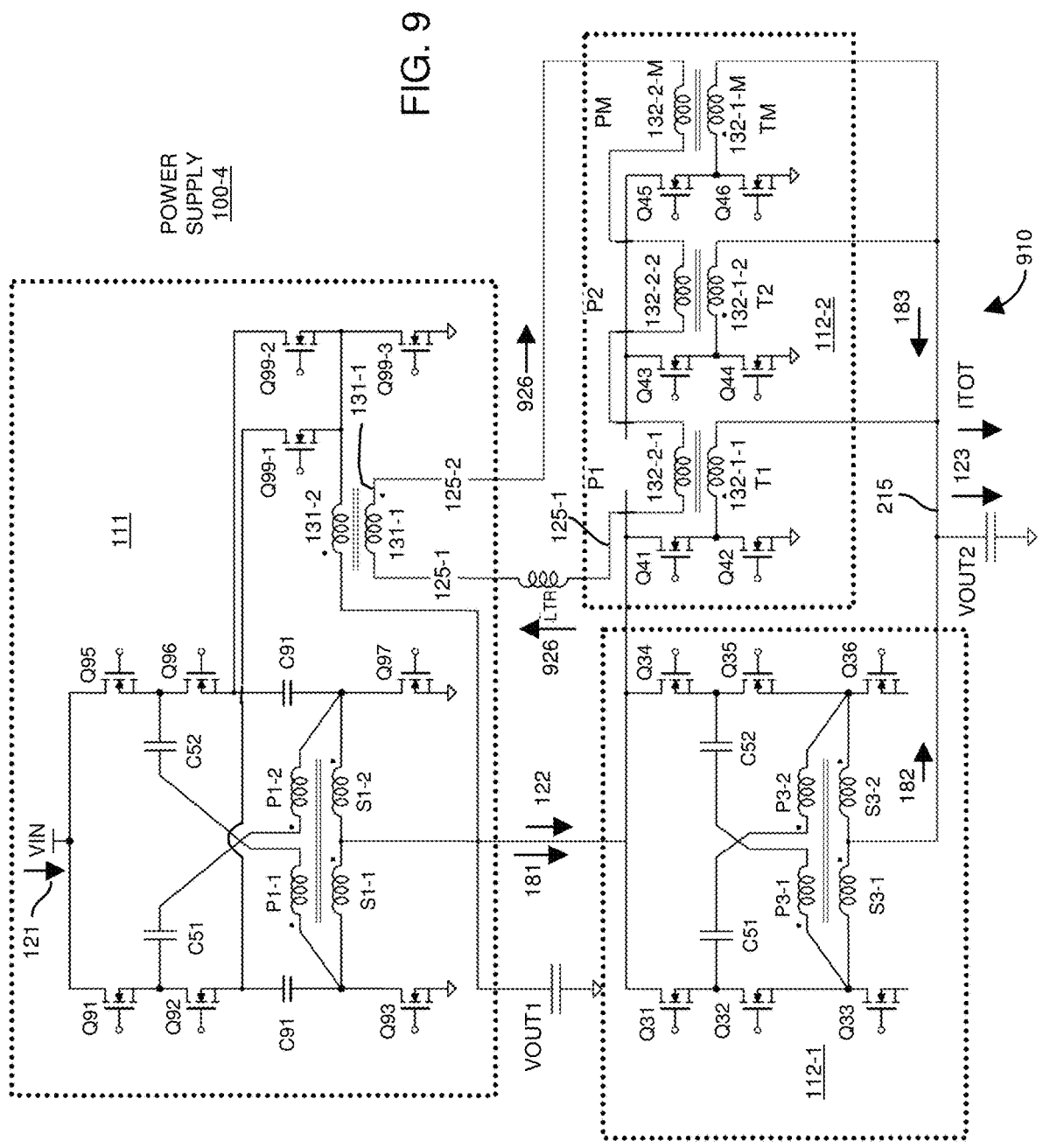
FIG. 9 is an example more detailed diagram illustrating implementation of a multi-stage power converter as described herein.

A more specific example of the power supply system in FIG. 8 is shown in FIG. 9, which includes the multi voltage-domain TLVR for RHSC first stage and buck multi-phase second stage.

FIG. 9 is an example detailed diagram illustrating implementation of a hybrid switch capacitor converter and a combination of a TLVR buck converter in parallel with a hybrid switch capacitor converter-current multiplier as described herein.

In this example, the power supply 100-4 includes multi-stage power converter 910. The power converter stage 112-2 includes multiple power converter phases P1, P2, . . . , Pm. Power converter phase P1 includes transformer T1 such as including transformer winding 132-1-1 magnetically coupled to transformer winding 132-2-1; power converter phase P2 includes transformer T2 including transformer winding 132-1-2 magnetically coupled to transformer winding 132-2-2; . . . ; and power converter phase PM includes transformer TM including transformer winding 132-1-M magnetically coupled to transformer winding 132-2-M.

Outputs of each of the regulated power converter phases P1, P2, . . . , and PM, are connected in parallel to produce the respective output voltage 123.

As further shown, the circuit path 125 provides serial connectivity of transformer winding 131-1, transformer winding 132-2-1, transformer winding 132-2-2, . . . , transformer winding 132-2-M, and inductor Ltr.

The current through circuit path 125 and transformer winding 131-1 results in:

1. A fast-increasing current from transformer winding 131-2 to produce the intermediate voltage 122 (a.k.a., $V_{out1}$).

2. A fast decrease of $V_{buck}$ voltage (in power converter stage 111), which increases $V_{HSC}$ and R-HSC power delivery through its HSC part (high magnitude current through $$R_{HSC}^{ps1}, L_{HSC}^{ps1}).$$

3. The summation of these two contributions increases $V_{out1}$ (intermediate voltage 122) and is multiplied to the output $V_{out2}$ (output voltage 123) through the power converter stage 112-2 (HSC-CM).

Note further that the first power converter stage 111 produces the output current 181 and intermediate voltage 122 supplied to the combination of power converter stage 112-1 and power converter stage 112-2. The power converter stage 112-1 produces the output current 182 to generate the corresponding output voltage 123 to power the load 118. The power converter stage 112-2 produces the output current 183 to produce the output voltage 123 and power the load 118.

As previously discussed, the power converter stage 112 includes a first power converter sub-stage 112-1 and a second power converter sub-stage 112-2 each of which is connected to a common output node 955 of the second power converter stage 112 to output the output voltage 123. The first power converter stage 111 may not be voltage regulated but may be current regulated. The first power converter sub-stage 112-1 of the second power converter stage 112 may be an unregulated DC-DC power converter stage. The second power converter sub-stage 112-2 of the second power converter stage 112 may provide voltage regulation of producing output voltage 123.

Yet further, the power converter second sub-stage 112-2 can be configured to increase a first current 183 outputted from the second power converter sub-stage 112-2 to produce the output voltage 123 in response to detecting a transient load condition in which the load powered by the output voltage 123 suddenly consumes more current. The increased current 183 causes an increased flow of second current 926 through a series combination of the transformer windings and corresponding circuit path 125 (125-1 and 125-2) in a manner as previously discussed. The increased flow of the second current 926 through the series combination transformer windings (132-2-1, 132-2-2, etc.) and corresponding circuit path 125 is operative to increase a current 181 supplied by the power converter stage 111 to produce the intermediate voltage 123, which is outputted to the power converter stage 112 as previously discussed.

Figure 10:
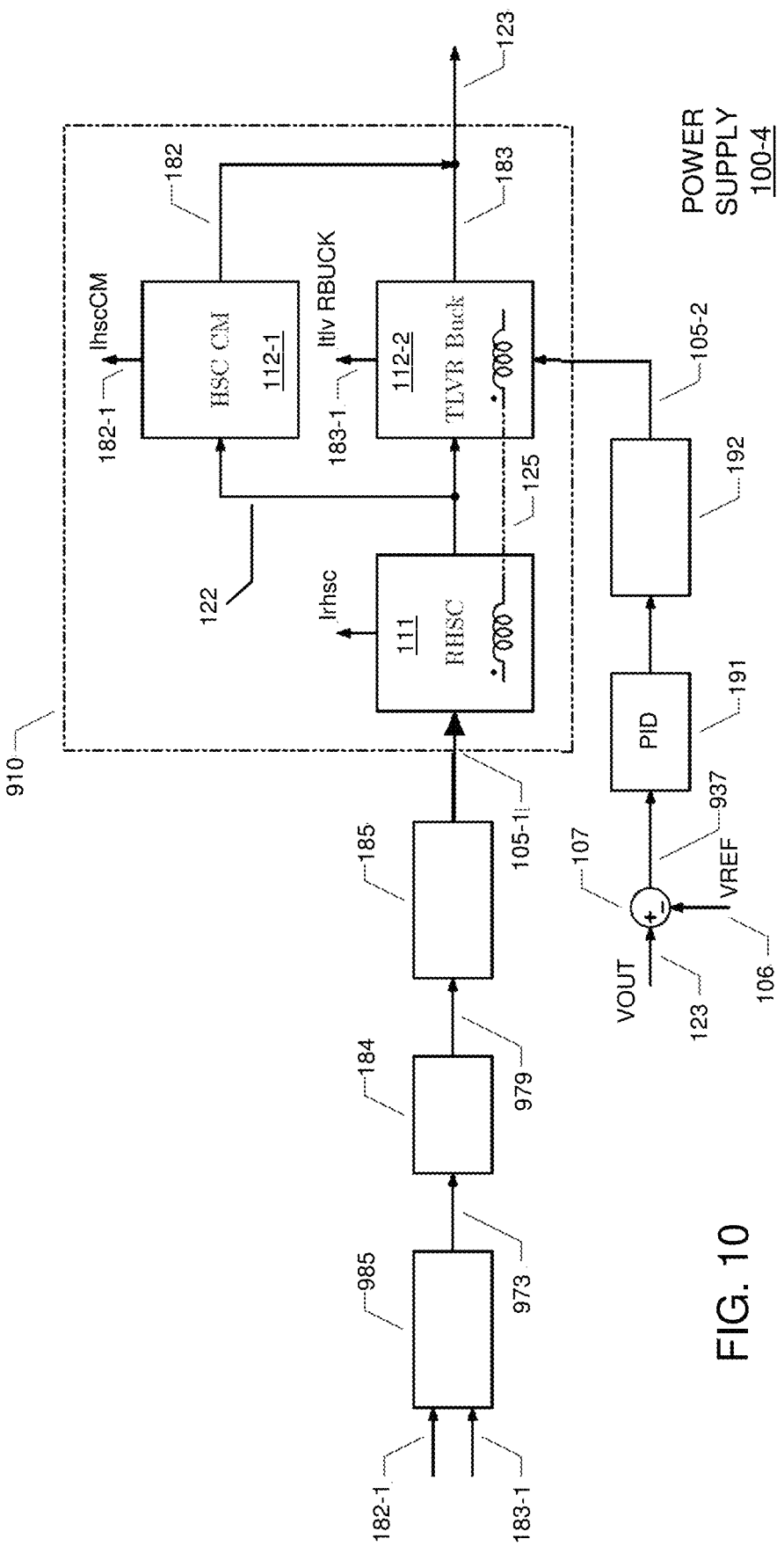
FIG. 10 is an example diagram illustrating a power supply system and corresponding components as discussed herein.
Figure 11:
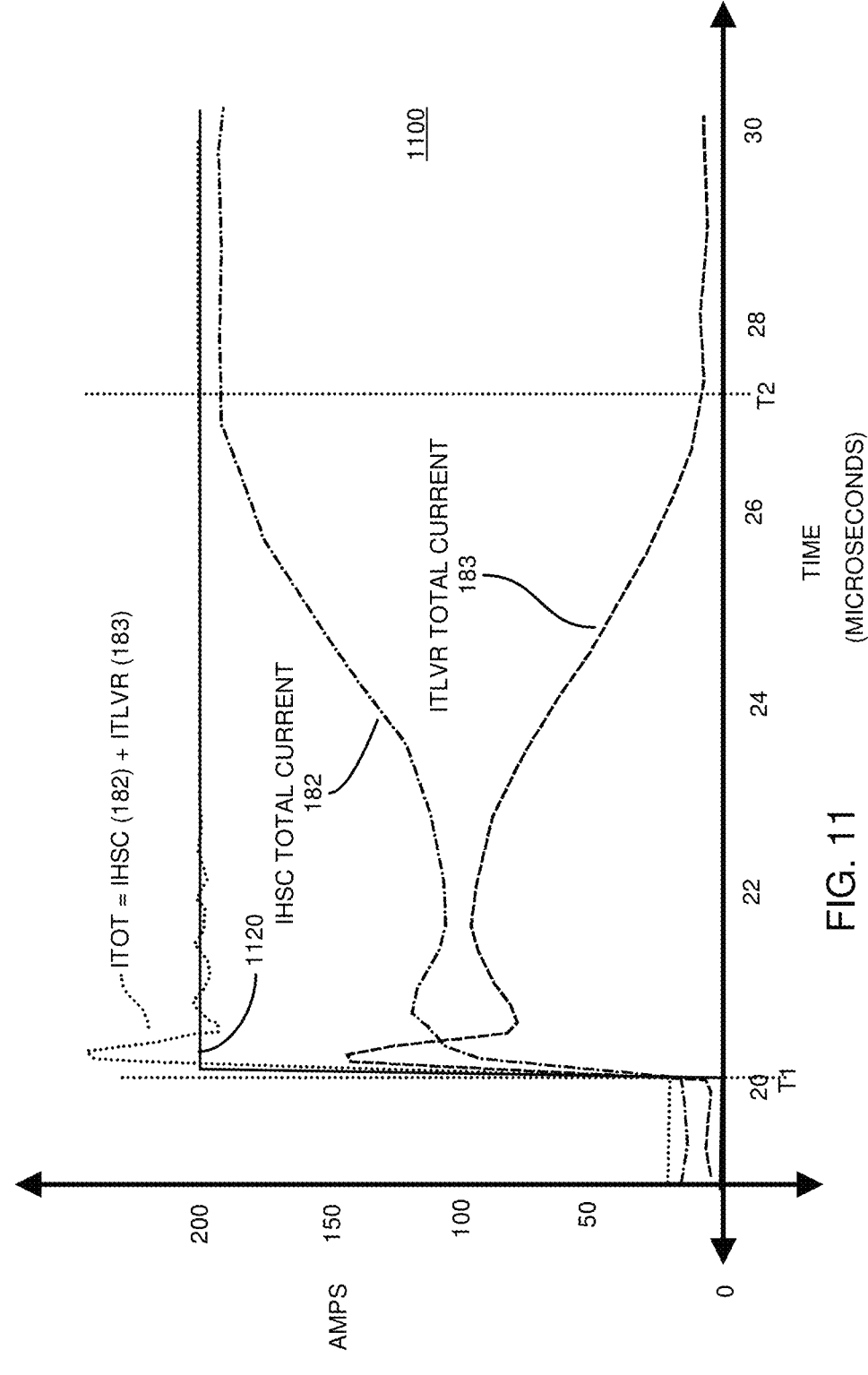
FIG. 11 is an example timing diagram illustrating current contribution associated with each of multiple power converter stages to produce an output voltage is described herein.

Further operation of DC-DC multistage power converter 910 and voltage regulation and current regulation/control is discussed in FIGS. 10 and 11.

FIG. 10 is an example diagram illustrating a power supply and corresponding components as discussed herein.

In this example, the power supply 100-4 includes additional components with respect to the multistage power converter 910 as previously discussed in FIG. 9. For example, this instance of the power supply 100-4 (FIG. 10) includes signal processor 985, controller 184, signal generator 185, summer 107, controller 191, signal generator 192, and the multistage power converter 910.

As previously discussed, the multistage power converter 910 includes power converter stage 111, power converter stage 112-1, and power converter stage 112-2. Further, as previously discussed, the power supply 910 includes a circuit path 125 providing connectivity between the transformer windings of the power converter stage 112-2 and the power converter stage 111 (also see FIG. 9 again).

During operation, the summer 107 receives the (DC) output voltage 123 as well as a corresponding DC setpoint reference voltage 106 (such as a desired DC voltage value) in which to control a magnitude of the output voltage 123. Based on a difference between the magnitude of the output voltage 123 and the setpoint reference voltage 106, the summer 107 produces the error signal 937. The controller 191 (such as a PID controller or other suitable entity) receives the error signal 937 and controls the pulse width modulation signal generator 192 accordingly to produce appropriate controls signal 105-2 to control operation of the multiple phases (such as phase P1, phase P2, . . . , phase PM) in the power converter stage 112-2. For example, if the magnitude of the output voltage 123 is below the setpoint reference voltage 106, the controller 191 produces the control signal 105-2 with increased duty cycle to drive the respective phases P1, P2, . . . , PM in the power converter stage 112-2. This prevents the magnitude of the output voltage 123 from falling much below the setpoint reference voltage 106. Conversely, if the magnitude of the output voltage 123 is above the setpoint reference voltage 106, the controller 191 produces the control signal 105-2 with a decreased duty cycle to drive the respective phases in the power converter stage 112-2. This prevents the magnitude of the output voltage 123 from raising much above the setpoint reference voltage 106.

Thus, the controller 191 increases a magnitude of the output current 183 supplied to the corresponding load 118 in response to a respective condition in which the magnitude of the output voltage 123 is below the setpoint reference voltage 106. Oppositely, the controller 191 decreases the magnitude of the output current 183 supplied to the corresponding load 118 in response to a respective condition which the magnitude of the output voltage 123 is above the setpoint reference voltage 106.

Accordingly, the controller 191 and corresponding signal generator 192 provide voltage regulation of producing the respective output voltage 123 based upon the received intermediate voltage 122.

As previously discussed, the power converter stage 112-2 includes a respective circuit path 125 providing connectivity of transformer windings in the power converter stage 112-2 to the transformer windings in power converter stage 111. During transient conditions, the magnetic coupling of the transformer windings used to produce the respective output current 183 provides increased energy (via current over circuit path 125) to the transformer windings in the power converter stage 111, boosting the amount of output current 181 supplied by the power converter stage 111 to the second power converter stage 112.

As further shown, the controller 184 and signal generator 185 control an apportionment of first power (output current 182) supplied by the first sub-stage 112-1 and second power (output current 183) supplied by the second sub-stage 112-2 depending on variations in a magnitude of the total output current (such as output current 182 plus output current 183) supplied by the output voltage 123 to power the load 118.

For example, the signal processor 985 receives signal 182-1 indicating a magnitude of the output current 182 supplied by the power converter stage 112-1 to the load 118. The signal processor 985 also receives signal 183-1 indicating a magnitude of the output current 183 supplied by the power converter stage 112-2 to the load 118. Based on these two inputs, the signal processor 985 produces error signal 973 indicating a respective difference between the signal 182-1 and the signal 183-1. In turn, the controller 184 produces the control signal 979 based on the error signal 973, which controls the power sharing between the power converter stage 112-1 and the power converter stage 112-2. This can be done forcing the signal 182-1 to be scaled by a factor from the signal 183-1. Given that the input voltages of the power converter stages 112-1 and 112-2 are fixed, this means that the power flowing in the power converter stage 112-1 will be scaled by a factor from the power flowing in the power converter stage 112-2. The reference signal 979 received by the pulse is width modulation signal generator 185, which produces the control signal 105-1 to control a duty cycle of one or more phases in the power converter stage 111.

In one example, the controller 184 and corresponding pulse width modulation signal generator 185 produce the control signal 105-1 such that the power converter stage 112-1 supplies most of the output current to power the load 118 during steady-state conditions.

Note that the controller 184 and corresponding circuitry can be configured to provide any appropriate apportionment of output current during steady-state conditions in which the total current consumed by the load 118 is not changing magnitude.

Note further that the controlled apportionment of output current from each of the power converter stage 112-1 and the power converter stage 112-2 may depend upon the efficiency of the respective power converter stages. For example, the power converter stage 112-1 in combination with power converter stage 111 may provide very high efficiency of powering the respective load 118. Thus, during steady-state conditions, when the total current consumed by the load 118 is not changing, it is desirable that the combination of power converter stage 111 and the power converter stage 112-1 provide most of the power to the load 118. However, the power converter stage 112-2 is beneficial in the circumstances to produce supplemental positive or negative output current to the load 118 during transient conditions in which the load 118 suddenly consumes much more current or suddenly consumes much less current with respect to steady-state conditions.

As further discussed below, the power converter stage 112-2 and corresponding voltage regulation provided by the troll 191 may provide very fast response, which is faster response than the combination of power converter stage 111 and power converter stage 112-1. This provides the best of both worlds in that the combination of the power converter stage 111 and power converter stage 112-1 for the most part generate the output current from the power converter 910 to power the respective load 118 during steady-state conditions while the power converter stage 112-2 provides fast response during transient conditions to maintain the magnitude of the output voltage with respect to the desired setpoint reference voltage 106. Yet further, as previously discussed, circuit path 125 provides the extra boost such that the power converter stage 111 and power converter stage 112-1 also support additional (positive or negative) current during a respective transient condition in which the load suddenly consumes a different amount of current.

Additional details about the response of the different voltage regulation loop and the current regulation loop (apportionment control) as discussed below in FIG. 11.

FIG. 11 is an example timing diagram illustrating current contribution associated with each of multiple power converter stage is to produce an output voltage is described herein.

As previously discussed, the controller 184 and corresponding circuitry are configured to constantly adjust/control apportionment of first power (such as output current 182) supplied by the first sub-stage 112-1 and second power (such as output current 183) supplied by the second sub-stage 112-2 to produce the output voltage 123 depending on variations in a magnitude of the total output current (output current 182 plus output current 183) supplied by the output voltage 123 to power the load 118. By controlling the amount of current supplied by a combination of the power converter stage 111 and the power converter stage 112-1, the controller 184 reduces the amount of current required by the power converter stage 112-2 to power the load after occurrence of a respective transient condition. In other words, when the controller 184 increases the amount of output current 181 supplied by the power converter stage 111 to the power converter stage 112-1, the power converter stage 112-1 in turn produces a higher magnitude of output current 182 to power the load 118. In such an instance, this increase of current provided by output current 182 alleviates the power converter stage 112-2 from supplying power (output current 183) to the load 118 via the output current 183, reducing the magnitude of the output current 183. An example is more specifically discussed below.

For example, as shown in timing diagram 1100, assume that the load 118 initially consumes about 20 amps up to time T1. Prior to time T1, during the steady-state conditions of the load 118 consuming around 20 amps, most of the current consumed by the load 118 is provided by the output current 182 from the power converter stage 112-1 while a much lesser amount of the total current consumed by the load 118 is provided by the output current 183. However, at time T1, the load 118 suddenly increases current consumption to around 200 amps. In such an instance, via the controller 191 and corresponding pulse width modulation signal generator 192, the power converter stage 112-2 immediately reacts and supplies a substantial increase in output current 183 supplied to the load 118. As previously discussed, via the circuit path 125, the power converter stage 112-2 also provides a boost feedback (increasing a magnitude of the current 926 in circuit path 125) from transformer windings in the power converter stage 112-2 to the transformer windings in power converter stage 111. As shown in FIG. 11, and corresponding timing diagram 1100, the boost feedback (via the circuit path 125) causes the power converter stage 111 to immediately increase the amount of output current 181 supplied by the power converter stage 111 to the power converter stage 112-1 to power the load 118. The total current ITOT supplied by the power converter stage 112 is output current 182 supplied by the power converter stage 112-1 and the output current 183 supplied by the power converter stage 112-2. Thus, the combination of additional current from both of the power converter stages 112-1 and 112-2 maintains a magnitude of the output voltage 123 with respect to the reference voltage 106.

As further shown between time T1 and time T2, the controller 184 and corresponding components readjust the duty cycle of controlling the power converter phases in the power converter stage 111 such that the combination of the power converter stage 111 and the power converter stage 112-1 eventually provide around 95 percent of the total output current consumed by the load 118 during steady-state. Thus, by around time T2, the current control loop associated with the controller 184 and corresponding control circuitry reapportion current supplied by the different power converter stages such that the more efficient power converter stage combination including power converter stage 111 and power converter stage 112-1 (the high-efficiency power conversion of the DC input voltage 121 to the DC output voltage 123) for the most part powers the respective load 118 again during steady-state conditions in which the magnitude of the output current consumed by the load is generally not changing.

Figure 12:
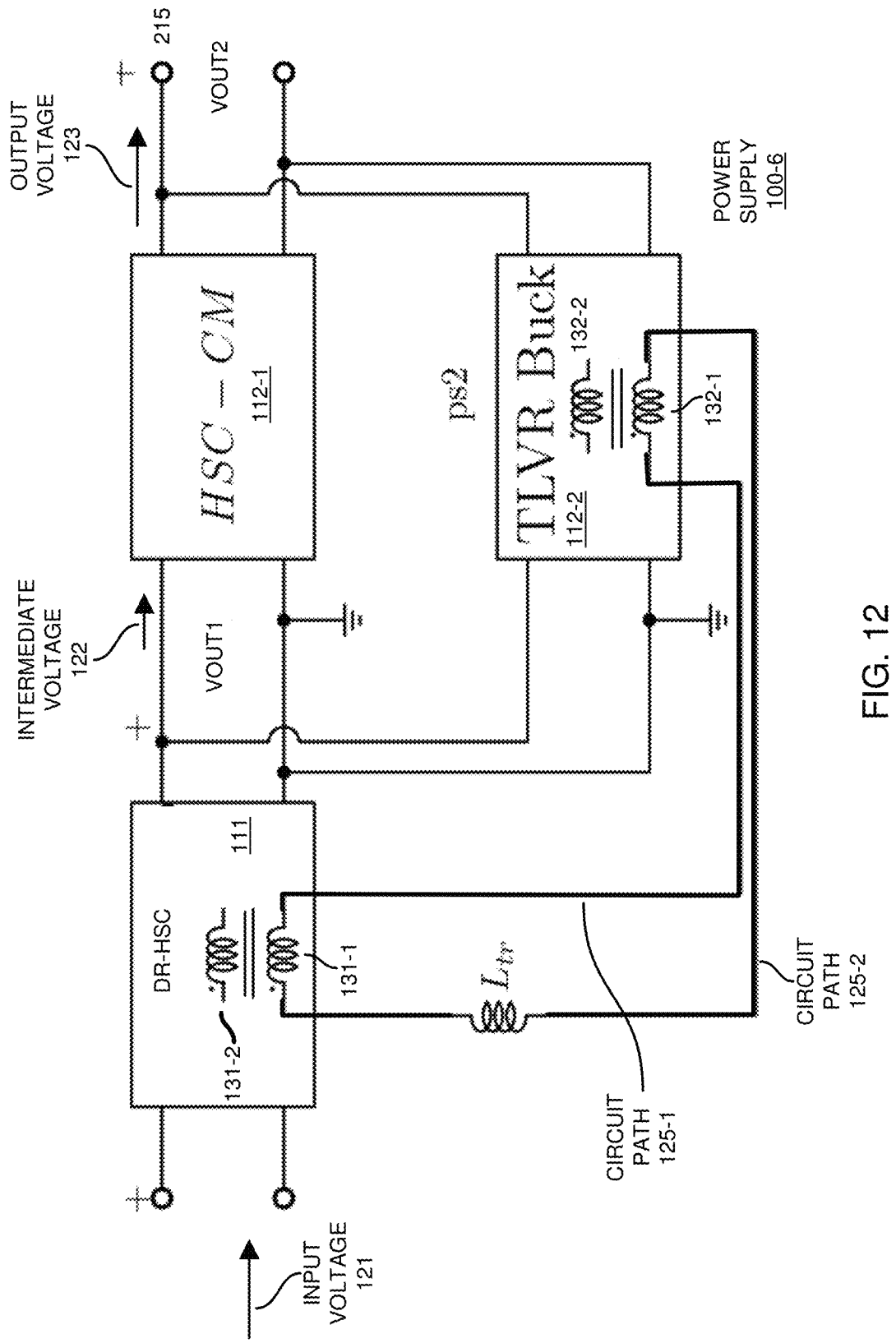
FIG. 12 is an example diagram illustrating implementation of a regulated hybrid switch capacitor converter and a TLVR buck converter in parallel with a hybrid switched capacitor converter-current multiplier as described herein.

FIG. 12 is an example diagram illustrating implementation of a regulated hybrid switch capacitor converter and a TLVR buck converter in parallel with a hybrid switch capacitor converter-current multiplier as described herein.

In this example, the power converter stage 111 (a.k.a., ps$_1$) is a DR-HSC converter while power converter stage 112-1 (such as ps$_3$) is a current multiplier. The DR-HSC includes a shared output inductor and is electrically coupled with the multi-phase TLVR buck stage via circuit path 125 in a manner as previously discussed. Power converter stage 112-2 is disposed in parallel with the power converter stage 112-1 (HSC-CM) to produce the output voltage 123.

The DR-HSC regulates the intermediate voltage 122 (V$_{out1}$). The TLVR buck (power converter stage 112-2) can be implemented with a current-controlled loop. The HSC-CM (112-1) can be configured to behave as DC-DC transformer with a given output impedance, and handles most of the power to maintain high overall efficiency during steady-state. The power sharing of producing the output voltage 123 between both power converter stage 112-1 and power converter stage 112-2 depends on the duty cycle of the TLVR buck and the impedance of both power supplies.

Figure 13:
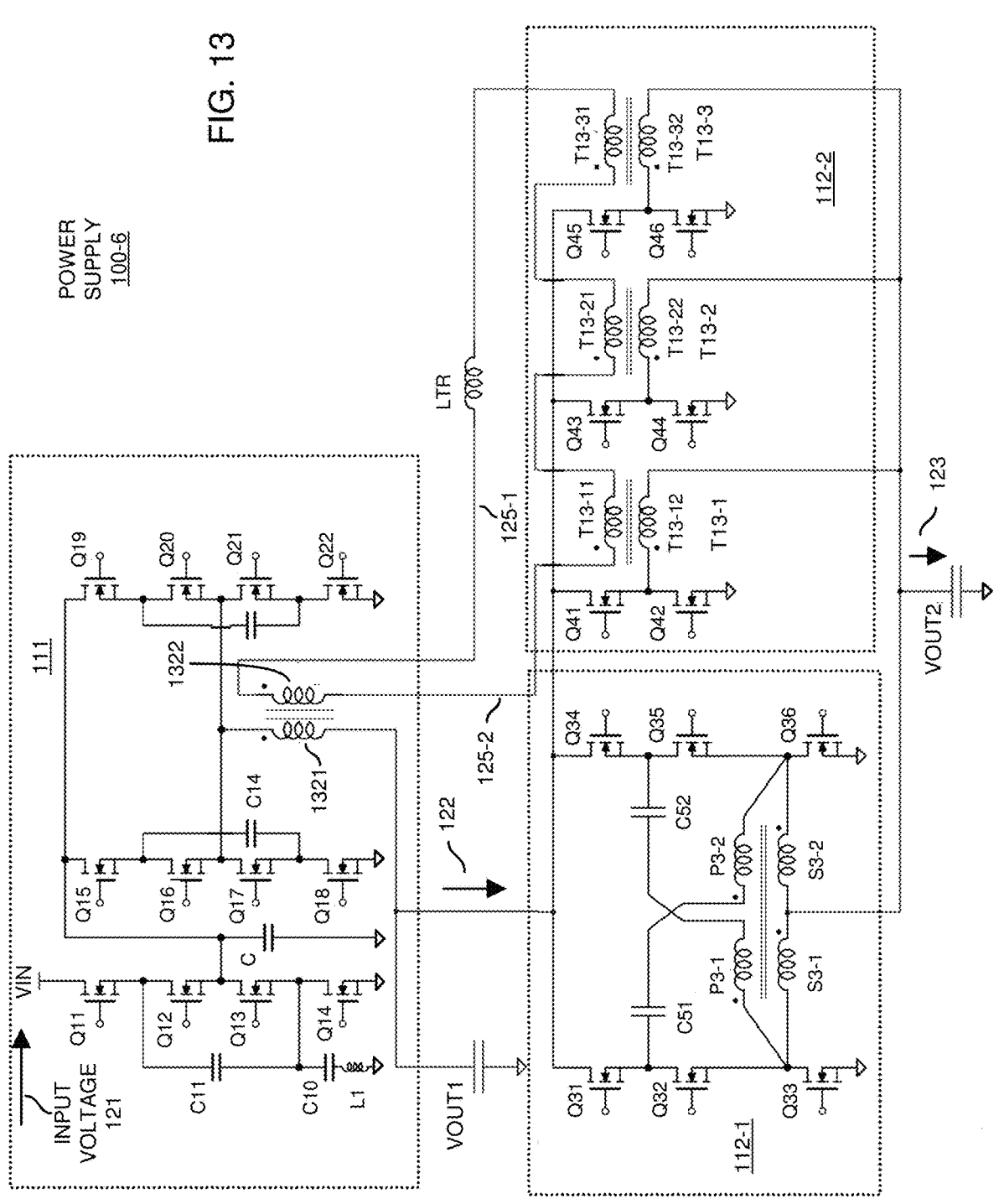
FIG. 13 is an example diagram illustrating implementation of a multi-stage power converter as described herein.

FIG. 13 is an example diagram illustrating a more detailed implementation of a regulated hybrid switch capacitor converter and a TLVR buck converter in parallel with a hybrid switch capacitor converter-current multiplier as described herein.

During a positive transient (load current increasing), the power converter stage 112-2 (TLVR buck converter) of example power supply 100-6 responds quickly, incrementing each phase duty-cycle: this action creates a boosting of the output voltage 123 (and/or output current) at the secondary transformer windings associated with transformer T13-1, T13-2, T13-3, etc., and additionally causing a steep current to manifest in the transient-line (circuit path 125) connected between power converter stage 111 and power converter stage 112-2.

The current through $$L_2^{ps1}$$

(winding 1322) in this example results in:
1. A fast-increasing current (122) from winding 1322

$$\left(\text{such as } L_1^{ps1}\right) \text{ to } V_{out1},$$

increasing a magnitude of the V$_{out1}$ voltage.
2. The increase of voltage magnitude in V$_{out1}$ causes the increase of voltage on V$_{out2}$ through HSC-CM (i.e. due to its low impedance current multiplier behavior).

Figure 14:
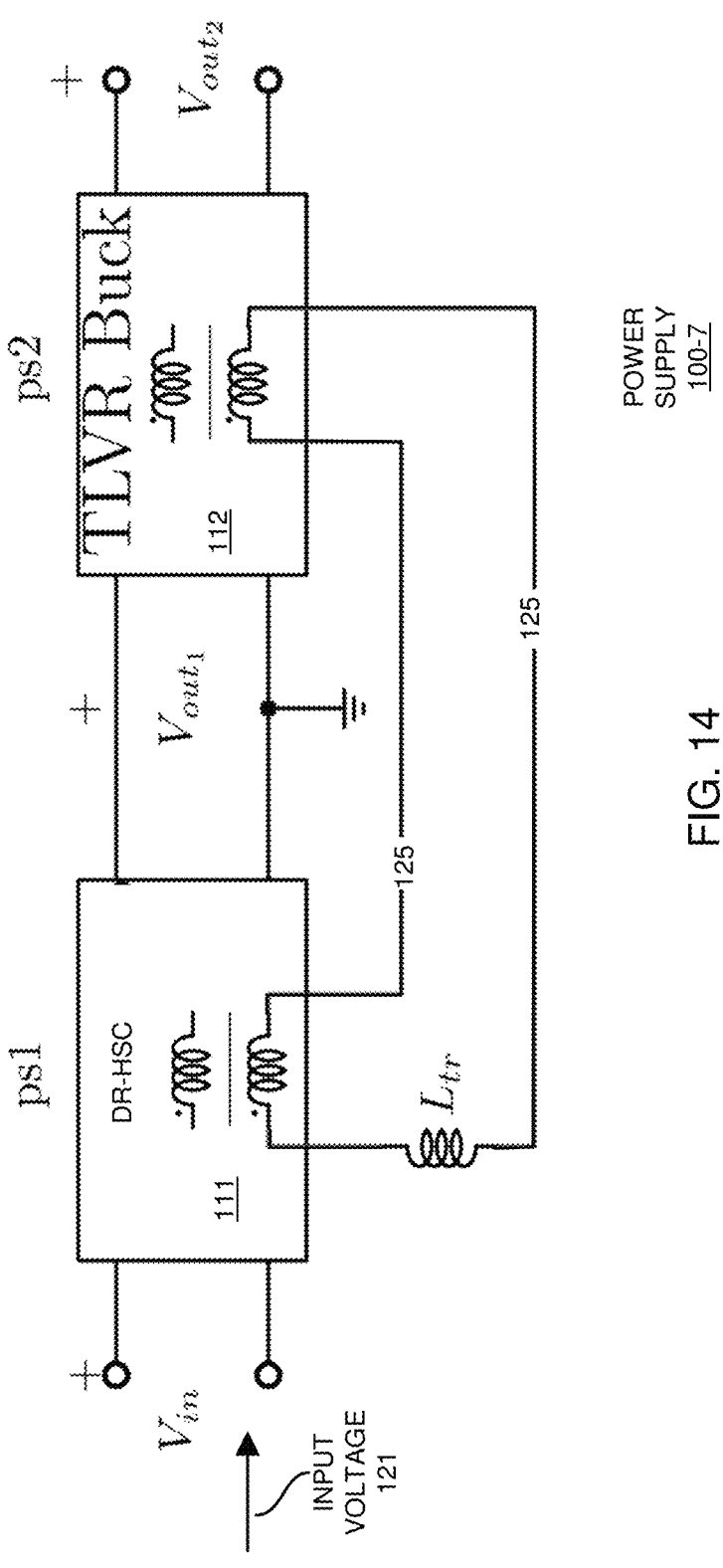
FIG. 14 is an example diagram illustrating a two-stage implementation of power converters having transformer windings that are electrically coupled via a respective circuit path to provide increased efficiency and fast transient load responses as described herein.

FIG. 14 is an example diagram illustrating a two-stage implementation of power converters having transformer windings that are electrically coupled via a respective circuit path to provide increased efficiency and fast transient load responses described herein.

Power supply 1400 is an example of a general implementation on an inductor based converter ps$_1$ (power converter stage 111) in combination with a buck converter stage (112) connected in a TLVR mode based on circuit path 125. Power supply 1400 in FIG. 14 shows one possible implementation of an 3LFC-DP converter as first power converter stage 111 ps$_1$ followed by an electric multi-stage coupled inductor (TLVR) power converter stage 112. In general, the power converter stage 111 can be implemented with any inductor-based power generation circuit.

During a positive transient (load current increasing), the TLVR buck responds quickly to increment each phase duty-cycle: this action creates a boosting voltage and causes a steep current to the conveyed to the circuit path 125 connected between power converter stage 111 ps$_1$ and power converter stage 112 ps$_2$.

In a manner as previously discussed, since power converter stage 111 and power converter stage 112 are electrically coupled via circuit path 125, the current outputted from the power converter stage 112 boosts current through circuit path 125 and the 3LFC-DP output inductor $$L_{3LFC-DP}^{ps1},$$

resulting in an increase of voltage on V$_{out1}$ and corresponding current and therefore an increase of equivalent gain in the buck converter portion (i.e. enforcing current slew rate on ps$_2$).

Figure 15:
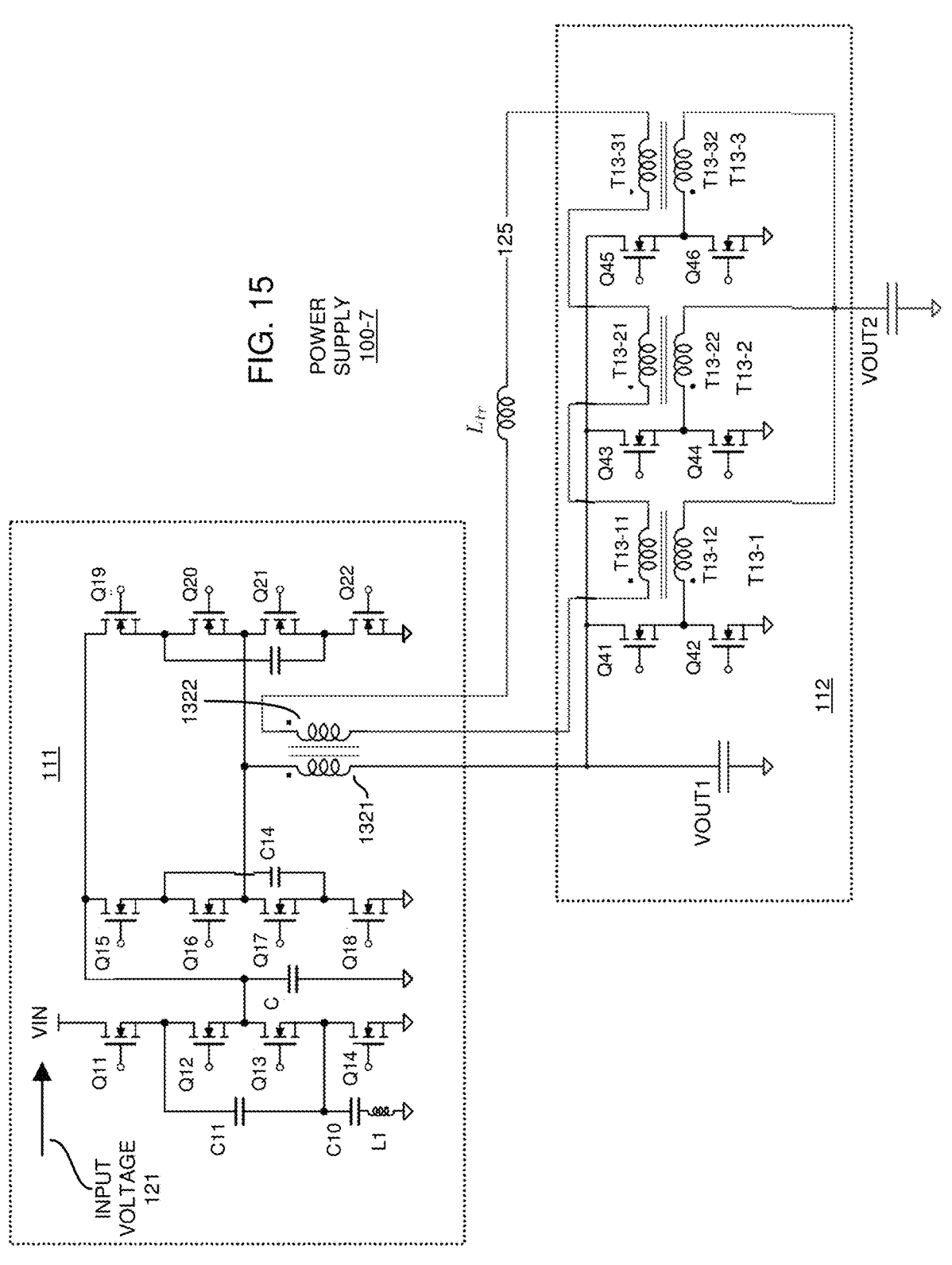
FIG. 15 is an example implementation of a multi-stage power converter as described herein.

FIG. 15 is an example implementation of a 3 level flying capacitor dual stage converter fall by a multiphase TLVR buck power converter as described herein.

The same current, since power converter stage 111 and power converter stage 112 are electrically coupled, boosts the 3LFC-DP output inductor L_(3LFC-DP)^ps1, resulting in an increase of voltage on VOUT1 (intermediate voltage 122) and therefore an increase of equivalent gain in the buck converter portion (i.e. enforcing current slew rate on power converter stage 112.

Figure 16:
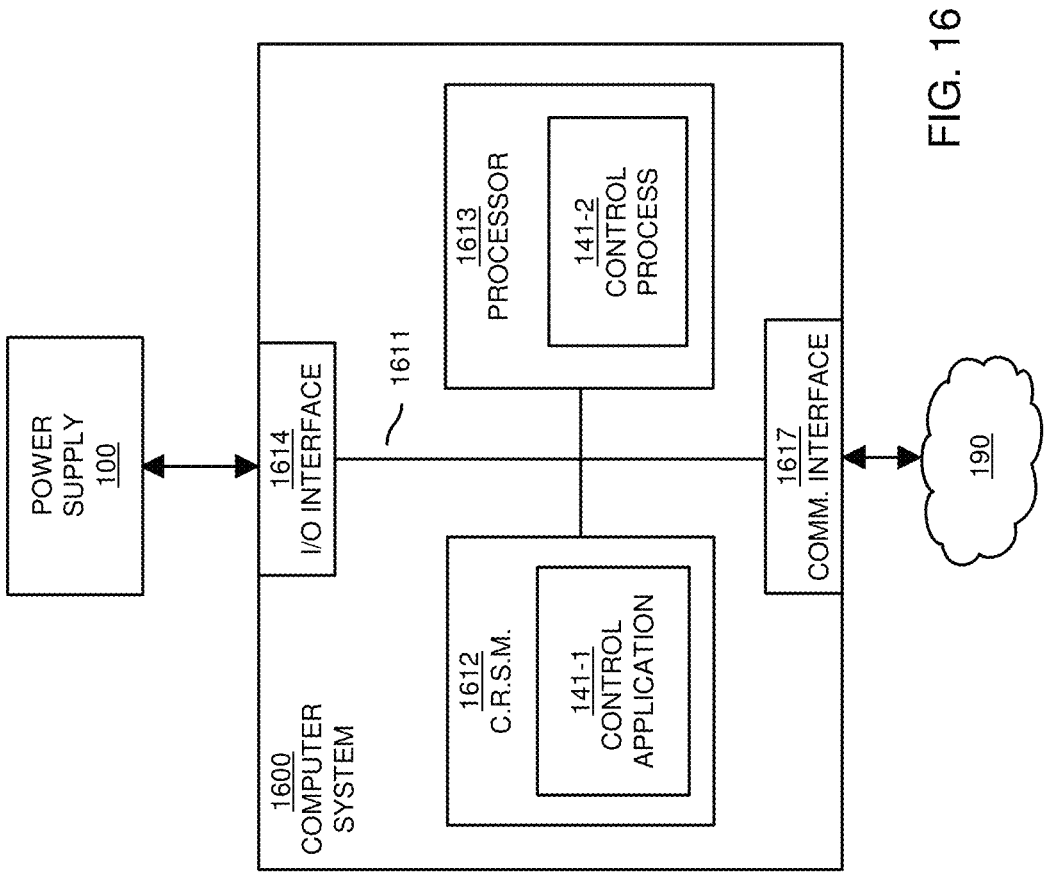
FIG. 16 is an example diagram illustrating computer architecture (such as a controller) operable to execute one or more operations according to embodiments herein.

FIG. 16 is an example block diagram of a computer system for implementing any of the operations as previously discussed according to embodiments herein.

Any of the resources (such as controller 184, pulse width modulation signal generator 185, the controller 191, pulse width modulation signal generator 192, etc.) as discussed herein can be configured to include computer processor hardware and/or corresponding executable instructions to carry out the different operations as discussed herein.

As shown, computer system 1600 of the present example includes an interconnect 1611 that couples computer readable storage media 1612 such as a non-transitory type of media (which can be any suitable type of hardware storage medium in which digital information can be stored and retrieved), a processor 1613 (computer processor hardware), I/O interface 1614, and a communications interface 1617.

I/O interface(s) 1614 supports connectivity to power supply 100 (any implementation such as power supply 100-1, 100-2, 100-3, etc.).

Computer readable storage medium 1612 can be any hardware storage device such as memory, optical storage, hard drive, floppy disk, etc. In one embodiment, the computer readable storage medium 1612 stores instructions and/or data.

As shown, computer readable storage media 1612 can be encoded with controller application 140-1 (e.g., including instructions) to carry out any of the operations as discussed herein.

During operation of one embodiment, processor 1613 accesses computer readable storage media 1612 via the use of interconnect 1611 in order to launch, run, execute, interpret or otherwise perform the instructions in controller application 140-1 stored on computer readable storage medium 1612. Execution of the controller application 140-1 produces controller process 140-2 to carry out any of the operations and/or processes as discussed herein.

Those skilled in the art will understand that the computer system 1600 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1450 may reside at any location or can be included in any suitable resource in any network environment to implement functionality as discussed herein.

Functionality supported by the different resources will now be discussed via flowcharts in FIG. 17. Note that the steps in the flowcharts below can be executed in any suitable order.

Figure 17:
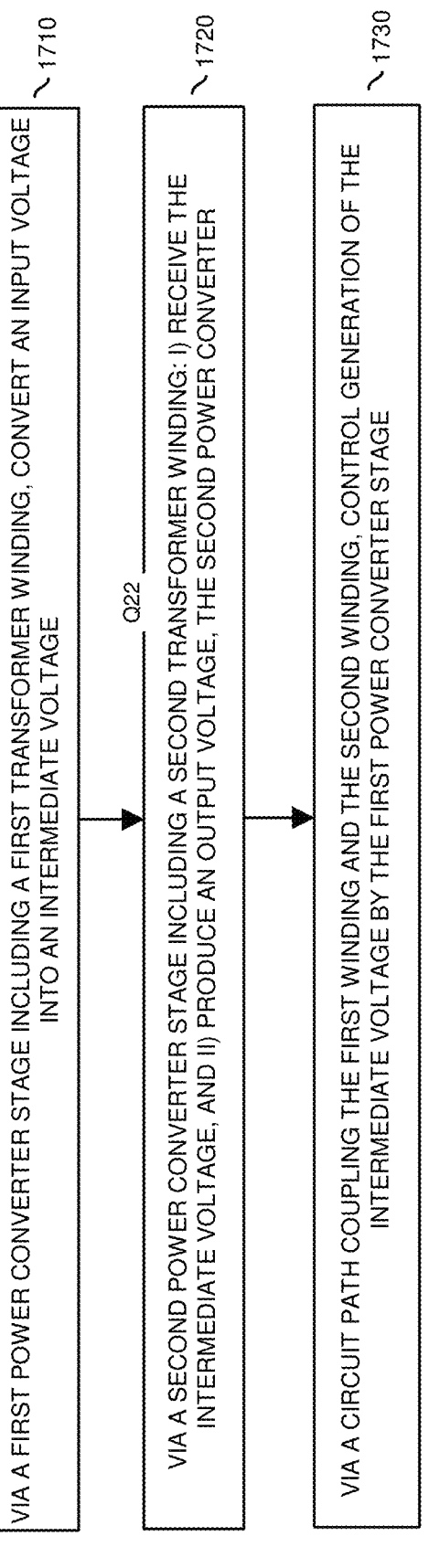
FIG. 17 is an example diagram illustrating a general method as discussed herein.

FIG. 17 is a flowchart 1700 illustrating an example method according to embodiments herein. Note that there will be some overlap with respect to concepts as discussed above.

In processing operation 1510, a first power converter stage including a first transformer winding converts an input voltage into an intermediate voltage.

In processing operation 1520, a second power converter stage including a second transformer winding: i) receives the intermediate voltage, and ii) produces an output voltage, the second power converter.

In processing operation 1530, a circuit path coupling the first winding and the second winding controls generation of the intermediate voltage by the first power converter stage.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a first power converter stage operative to convert an input voltage into an intermediate voltage, the first power converter stage including a first transformer winding;
a second power converter stage operative to receive the intermediate voltage and produce an output voltage to power a load, the second power converter stage including a second transformer winding;
a circuit path coupling the first transformer winding in the first power converter stage to the second transformer winding in the second power converter stage; and
wherein the circuit path is operative to convey a first current from the second transformer winding in the second power converter stage to the first transformer winding in the first power converter stage.

2. The apparatus as in claim 1, wherein the circuit path directly connects the first transformer winding and the second transformer winding in series.

3. The apparatus as in claim 1, wherein the first transformer winding is a secondary winding of a first transformer disposed in the first power converter stage, the secondary winding of the first transformer being magnetically coupled to a primary winding of the first transformer, the primary winding of the first transformer operative to produce the intermediate voltage; and
wherein the second transformer winding is a secondary winding of a second transformer disposed in the second power converter stage, the secondary winding of the second transformer being magnetically coupled to a primary winding of the second transformer, the primary winding of the second transformer operative to produce the output voltage.

4. The apparatus as in claim 1, wherein a magnitude of the first current varies depending on a variation of a magnitude of output current supplied by the output voltage to the load.

5. The apparatus as in claim 4, wherein the magnitude of the first current conveyed by the circuit path at least in part controls generation of the intermediate voltage by the first power converter stage.

6. The apparatus as in claim 1, wherein the second power converter stage includes a first sub-stage and a second sub-stage connected in parallel to receive the intermediate voltage and convert the intermediate voltage into the output voltage, the second sub-stage including the second transformer winding, the apparatus further comprising:
a controller operative to adjust apportionment of first power supplied by the first sub-stage and second power supplied by the second sub-stage to produce the output voltage depending on variations in a magnitude of output current supplied by the output voltage to power a load.

7. The apparatus as in claim 1, wherein the input voltage is a first input voltage;
wherein the second power converter stage includes a first sub-stage operative to receive the intermediate voltage and convert the intermediate voltage into the output voltage; and
wherein the second power converter stage includes a second sub-stage operative to receive a second input voltage and convert the second input voltage into the output voltage, the second input voltage being independent of the first input voltage; and
wherein the second input voltage is greater in magnitude than the first input voltage.

8. The apparatus as in claim 1 further comprising:
a third transformer winding disposed in series with the first transformer winding;

a fourth transformer winding disposed in series with the second transformer winding; and wherein the circuit path provides series connectivity of the first transformer winding, the second transformer winding, the third transformer winding, and the fourth transformer winding.

9. The apparatus as in claim 1 further comprising:

an inductor component disposed in series with the first transformer winding and the second transformer winding via the circuit path, the inductor component operative to control a transient response of producing the output voltage.

10. The apparatus as in claim 1, wherein the circuit path creates a series circuit loop including an inductor component, the first transformer winding, and the second transformer winding.

11. The apparatus as in claim 10, wherein a node of the series circuit loop is coupled to a ground reference voltage.

12. The apparatus as in claim 1, wherein the first power converter stage is referenced with respect to a first ground reference voltage; and wherein the second power converter stage is referenced with respect to a second ground reference voltage.

13. The apparatus as in claim 1, wherein the second power converter stage includes a first sub-stage and a second sub-stage each of which is connected to a common output node of the second power converter stage to produce the output voltage;

wherein the first power converter stage is a regulated voltage converter stage;

wherein the first sub-stage of the second power converter stage is an unregulated voltage converter stage; and wherein the second sub-stage of the second power converter stage is a regulated voltage converter stage providing regulation of generating the output voltage.

14. The apparatus as in claim 13, wherein the second sub-stage is operative to increase a second current outputted from the second sub-stage to produce the output voltage in response to detecting a transient load condition, the increased second current causing an increased flow of the first current through a series combination of the second transformer winding, the circuit path, and the first transformer winding; and wherein the increased flow of the first current through the series combination is operative to increase a third current supplied by the intermediate voltage from the first power converter stage to the second power converter stage.

15. The apparatus as in claim 1 further comprising:

a third transformer winding disposed in the first power converter stage, the third transformer winding inductively coupled to the first transformer winding, the third transformer operative to produce the intermediate voltage; and a fourth transformer winding inductively coupled to the second transformer winding, the fourth transformer winding operative to produce the output voltage.

16. The apparatus as in claim 15, wherein the circuit path is a first circuit path connecting the first transformer winding in series with the second transformer winding; and the apparatus further comprising a second circuit path connecting the first transformer winding in series with the second transformer winding.

17. The apparatus as in claim 16, wherein a combination of the first transformer winding, the first circuit path, the second transformer winding, and the second circuit path form a circuit loop; and

wherein the circuit loop is operative to convey current between the first power converter stage and the second power converter stage.

18. The apparatus as in claim 1, wherein an intermediate current outputted from the first power converter stage is generated based at least in part on the first current conveyed through the circuit path.

19. The apparatus as in claim 1 further comprising:

a third transformer winding disposed in the first power converter stage, the third transformer winding inductively coupled to the first transformer winding, the third transformer winding operative to produce the intermediate voltage;

a fourth transformer winding inductively coupled to the second transformer winding, the fourth transformer winding operative to produce the output voltage; and wherein the circuit path includes an inductor disposed in series with the first transformer winding and the second transformer winding.

20. A method comprising:

via a first transformer winding of a first power converter stage, converting an input voltage into an intermediate voltage;

via a second power converter stage including a second transformer winding: i) receiving the intermediate voltage, and ii) producing an output voltage via the second transformer winding;

via a circuit path coupling the first transformer winding and the second transformer winding, controlling generation of the intermediate voltage by the first power converter stage; and wherein the circuit path conveys first current from the second transformer winding in the second power converter stage to the first transformer winding in the first power converter stage, a magnitude of the first current varying depending on a variation of a magnitude of output current supplied by the output voltage to the load.

21. The method as in claim 20, wherein the second power converter stage includes a first sub-stage and a second sub-stage connected to a common output node from which the output voltage is outputted, the second sub-stage including the second transformer winding, the method further comprising:

via the first sub-stage of the second power converter stage, providing steady state power output to the common output node to generate the output voltage; and via the second sub-stage of the second power converter stage, providing transient power output to the common output node to generate the output voltage.

22. The method as in claim 21 further comprising:

detecting a variation in the magnitude of the output current supplied by the output voltage to power a load; and in response to the variation, adjusting apportionment of first power supplied by the first sub-stage to the load and second power supplied by the second sub-stage to the load.

23. An apparatus comprising:

a first power converter stage operative to convert an input voltage into an intermediate voltage, the first power converter stage including a first transformer winding;

a second power converter stage operative to receive the intermediate voltage and produce an output voltage to power a load, the second power converter stage including a second transformer winding; and a circuit path coupling the first transformer winding in the
first power converter stage to the second transformer
winding in the second power converter stage, the
apparatus further comprising:

a first primary winding in the first power converter stage
inductively coupled to the first transformer winding;

wherein a first current conveyed through the first primary
winding contributes to generating the intermediate
voltage;

a second primary winding in the second power converter
stage inductively coupled to the second transformer
winding; and wherein a second current conveyed through the second
primary winding contributes to an output current powering the load.

\* \* \* \* \*